US011007692B1

(12) United States Patent
Galati

(10) Patent No.: US 11,007,692 B1
(45) Date of Patent: *May 18, 2021

(54) NON-COAXIALLY MOUNTED ELECTRIC ACTUATOR AND TRANSMISSION

(71) Applicant: Synventive Molding Solutions, Inc., Peabody, MA (US)

(72) Inventor: Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,439

(22) Filed: Jan. 11, 2021

Related U.S. Application Data

(63) Continuation of application No. 15/915,220, filed on Mar. 8, 2018, now Pat. No. 10,899,056, which is a
(Continued)

(51) Int. Cl.
*B29C 45/28* (2006.01)

(52) U.S. Cl.
CPC .... *B29C 45/281* (2013.01); *B29C 2045/2865* (2013.01); *B29C 2045/2872* (2013.01);
(Continued)

(58) Field of Classification Search
CPC ............... B29C 45/231; B29C 45/281; B29C 2945/76598
See application file for complete search history.

(56) References Cited

U.S. PATENT DOCUMENTS

| 5,556,582 A | 9/1996 | Kazmer |
| 6,294,122 B1 | 9/2001 | Moss et al. |

(Continued)

FOREIGN PATENT DOCUMENTS

| DE | 19857735 A1 | 6/2000 |
| DE | 19956215 C2 | 6/2001 |

(Continued)

OTHER PUBLICATIONS

Int'l. Search Report and Written Opinion dated Sep. 22, 2014 in Int'l. Appln. No. PCT/US2014/045648.
(Continued)

*Primary Examiner* — James Sanders
(74) *Attorney, Agent, or Firm* — Polsinelli, PC

(57) ABSTRACT

An apparatus for controlling the rate of flow of fluid mold material comprising:
a manifold, a valve pin having a pin axis, a pin connector and a stem, the valve pin being drivable into and out of open and closed positions relative to the gate,
an electric actuator comprising an electric motor comprised of a motor housing that houses a drive shaft having a drive gear and a drive axis, a transmission comprised of a transmission gear having a gear axis, the drive gear, the transmission gear and the valve pin being drivably interconnected and arranged such that the drive axis and the gear axis are non-coaxially mounted or disposed relative to each other and the valve pin is drivable linearly along the pin axis, wherein one or the other of the motor housing or the transmission housing are removably attached to a top clamping or mounting plate that is mounted upstream of the manifold and fixedly interconnected to a mold.

30 Claims, 27 Drawing Sheets

Related U.S. Application Data continuation of application No. 15/286,917, filed on Oct. 6, 2016, now Pat. No. 9,937,648, which is a continuation of application No. 14/325,443, filed on Jul. 8, 2014, now Pat. No. 9,492,960.

(60) Provisional application No. 61/843,561, filed on Jul. 8, 2013.

(52) U.S. Cl.
CPC ............... *B29C 2945/7628* (2013.01); *B29C 2945/76076* (2013.01); *B29C 2945/76277* (2013.01); *B29C 2945/76381* (2013.01); *B29C 2945/76545* (2013.01); *B29C 2945/76568* (2013.01); *B29C 2945/76598* (2013.01); *B29C 2945/76755* (2013.01); *B29C 2945/76759* (2013.01); *B29C 2945/76859* (2013.01); *B29C 2945/76933* (2013.01); *B29C 2945/76939* (2013.01)

(56) References Cited

U.S. PATENT DOCUMENTS

| | | |
|---|---|---|
| 7,121,820 B2 | 10/2006 | Tooman et al. |
| 7,541,707 B2 | 6/2009 | Hochhalter et al. |
| 7,588,436 B2 | 9/2009 | Tooman et al. |
| 8,091,202 B2 | 1/2012 | Galati et al. |
| 8,256,313 B2 | 9/2012 | Ganter |
| 2004/0082431 A1 | 4/2004 | Maydew |
| 2004/0150125 A1 | 8/2004 | Huard |
| 2004/0262792 A1 | 12/2004 | Huard et al. |
| 2008/0014296 A1 | 1/2008 | Tooman et al. |
| 2010/0225025 A1 | 9/2010 | Striegel |
| 2013/0104682 A1 | 5/2013 | Schneider |

FOREIGN PATENT DOCUMENTS

| | | |
|---|---|---|
| DE | 10 2010 008 610 A1 | 8/2011 |
| DE | 102011106606 A1 | 12/2012 |
| DE | 602013011042.5 | 1/2014 |
| DE | 202014011323 U1 | 6/2019 |
| EP | 0831250 A2 | 3/1998 |
| EP | 1025974 B1 | 4/2004 |
| EP | 2333377 A1 | 6/2011 |
| EP | 2620266 B1 | 3/2015 |
| EP | 2679374 B1 | 9/2016 |
| EP | 3342575 A1 | 7/2018 |
| JP | H6-064002 A | 3/1994 |
| WO | 2010128984 A1 | 11/2010 |
| WO | 2010129782 A2 | 11/2010 |
| WO | 2015006261 A1 | 1/2015 |

OTHER PUBLICATIONS

Int'l. Preliminary Report on Patentability dated Sep. 24, 2015 in Int'l. Appln. No. PCT/US2014/045648.
HRS Flow Product Sheet, the new FLEXflow, HRS Flow Hotrunner Technology, S. Polo di Piave, Italy.
Mold Masters E-Drive User Manual, Mold-Masters Limited, Georgetwon, Ontario, Canada.
Inglass Defense and Translation, Jun. 24, 2019.
Litigation document Exhibit 2, Apr. 9, 2019.
Analysis of the protection claim, Oct. 15, 2019.
Certified Priority document, U.S. Appl. No. 61/843,561, retrieved Jul. 25, 2014.
English machine translation of DE 19857735, Oct. 15, 2019.
English machine translation of DE 19956215, Oct. 15, 2019.
Inglass German Complaint and Translation, Oct. 14, 2019.
Notice of Opposition against EP3342575 B1 letter, Oct. 14, 2019.
Notice of opposition against EP3342575, Sep. 25, 2019.
Acknowledgment Receipt of Opposition proceedings in relation to EP18152031.3, Oct. 14, 2019.
Application to Ministry of Universities and Scientific and Technological Research for financial support from the "Fondo Agevolazioni per la Ricerca (FAR)" (fund for the promotion of research) filed by INCOS S.p. A, on Jul. 18, 2003 (now INglass S.p.A.).
Ministry's refusal of the subsidy to INCOS S.p.A. (now INglass S.p.A.) issued Dec. 16, 2003.
Ministry grant letter May 25, 2014.
Loan Agreement between INCOS S.p.A. and INTERBANCA S.p. A. summer 2007.
Extract from register of the Chamber of Commerce, Industry, Handicrafts and Agriculture re: S.A. Tech s.r.l.
Email correspondence between Marco Salvador and Dario Girelli (owner of S.A. Tech s.r.l.) re: meeting in Nov. 2017.
Email re: outcome of Nov. 28, 2017 meeting between Marco Salvador and Dario Girelli.
Product Data Sheet of Stepnet Panel control system from 2006 (in German).
Feb. 29, 2008 email and invoice from software company.
Test report of Apr. 10, 2008 by Marco Salvador concerning the first version of the software.
Apr. 14, 2008 summary of Dario Girelli and Marco Salvador re: the main features and applications for the newly developed software.
Jun. 16, 2008 offer from S.A. Tech s.r.l.
Jun. 30, 2008 acceptance of offer.
Email re: further development of software program.
Jul. 22, 2008 Offer from S.A. Tech s.r.l. re: PowerPoint "080722 specifiche tecniche (Satech).ppt".
Oct. 29, 2008 test report.
Jan. 22, 2009 final report to financing bank.
Chronological extract from the commercial register of Hella KGaA Hueck & Co.
Oct. 26, 2007 offer to Hella.
Jul. 4, 2008 PowerPoint presentation.
Aug. 18, 2008 invoice to Hella.
Nullity Complaint with exhibits and translation of complaint.
Figure 1 of JP H6-064002.
Infringer's Reply to EP'266 with translation.
Answer of Infringer to German Complaint translated into English.
English machine translation of JPH6-064002; Aug. 9, 2019.
German Definition of Servomotor; Wikipedia: https://de.wikipedia.org/w/index.php?title=Servomotor&oldid=79998892; Aug. 2, 2019.
English machine translation of DE 10 2010 008 610; retreived from www.epspacenet.com on Jan. 20, 2020.

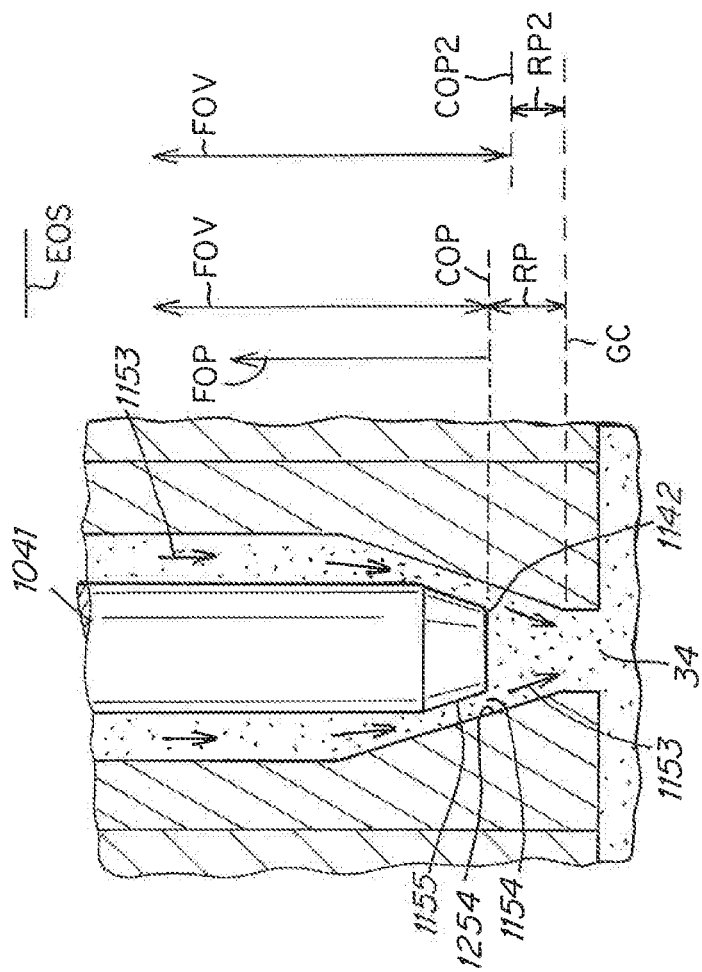
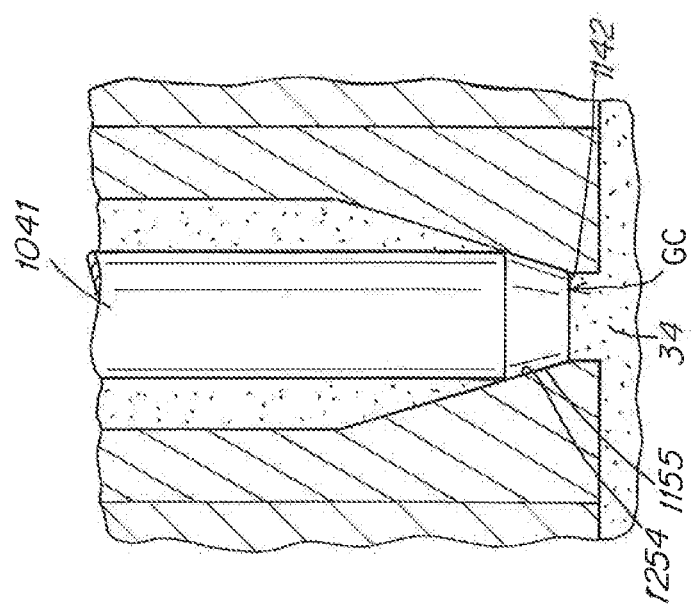
Fig. 11A
Fig. 11B

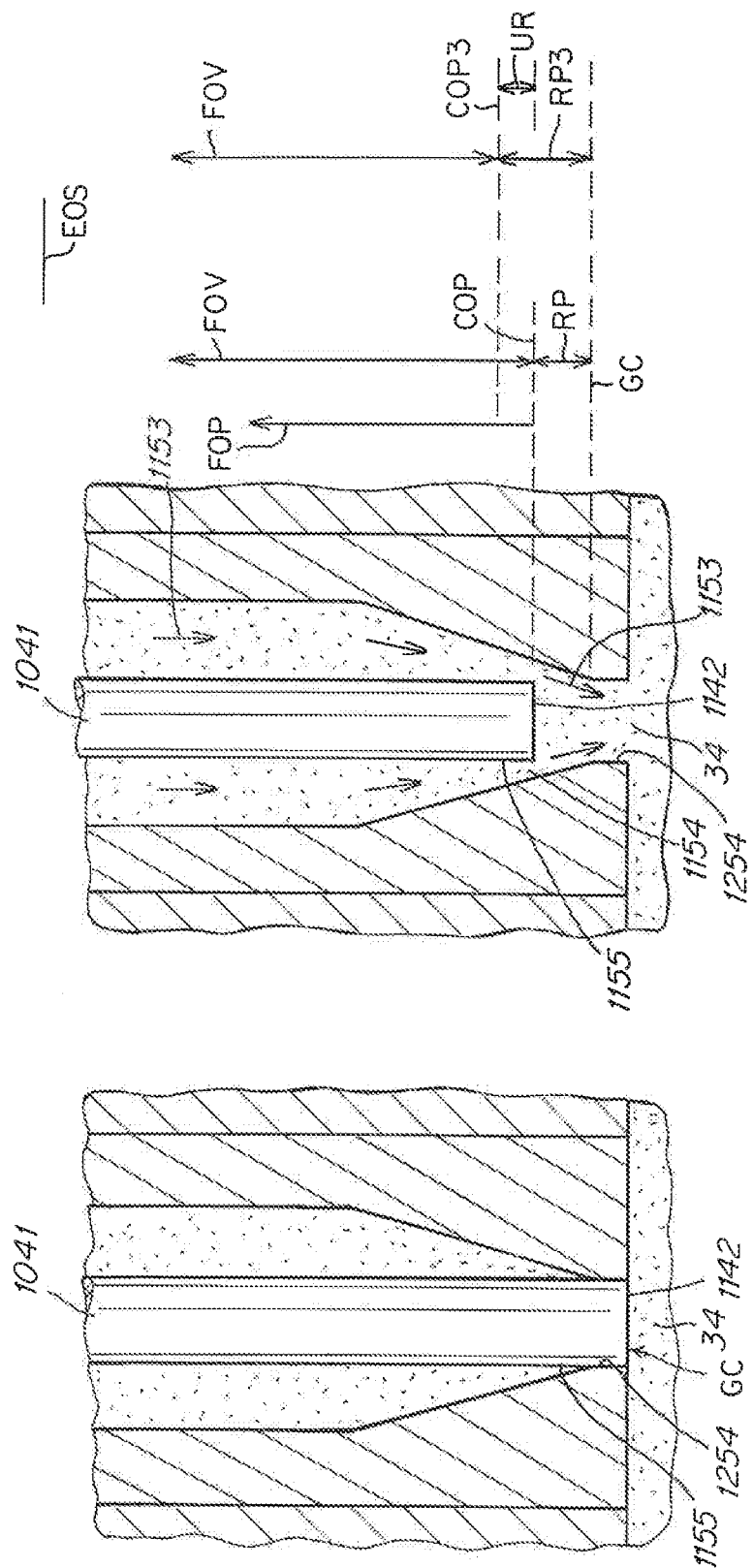

NON-COAXIALLY MOUNTED ELECTRIC ACTUATOR AND TRANSMISSION

RELATED APPLICATIONS

This application is a continuation of and claims the benefit of priority to U.S. application Ser. No. 15/915,220 filed Mar. 8, 2018 which is a continuation of U.S. application Ser. No. 15/286,917 filed Oct. 6, 2016 which is a continuation of U.S. application Ser. No. 14/325,443 filed Jul. 8, 2014 which claims priority to U.S. Provisional Application No. 61/843,561 filed Jul. 8, 2013, the disclosures of all of the foregoing of which are incorporated by reference in their entirety as if fully set forth herein.

This application is a continuation-in-part of and claims the benefit of priority to U.S. application Ser. No. 14/567,308 filed Dec. 11, 2014 which is a continuation of Ser. No. 13/484,336 filed May 31, 2012 which is a continuation of PCT/US2011/062099 filed Nov. 23, 2011, the disclosures of both of the foregoing are incorporated by reference in their entirety as if fully set forth herein.

This application is also a continuation-in-part of and claims the benefit of priority to U.S. application Ser. No. 14/567,369 filed Dec. 11, 2014 which is a continuation of U.S. application Ser. No. 13/484,408 filed May 31, 2012 which is a continuation of PCT/US2011/062096 filed Nov. 23, 2011, the disclosures of both of the foregoing are incorporated by reference in their entirety as if fully set forth herein.

This application is also a continuation-in-part of and claims the benefit of priority to U.S. application Ser. No. 14/311,785 filed Jun. 23, 2014.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070) and PCT/US2011/062099 filed Nov. 23, 2011 and PCT/US2011/062096 filed Nov. 23, 2011.

BACKGROUND OF THE INVENTION

Injection molding systems powered electric actuators have been developed having a drive rotor with an axis aligned with the axis of a valve pin to cause the pin to move either upstream or downstream over the course of the injection portion of an injection cycle in order to raise or lower the rate of flow of fluid material to correspond to a predetermined profile of fluid flow rates for the injection cycle.

SUMMARY OF THE INVENTION

In accordance with the invention there is provided, an apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the liner travel converter and the valve pin being interconnected to a downstream end of the linear travel converter, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold.

The valve pin typically comprises a pin stem and a pin connector, the linear travel converter having a coupling that is reversibly couplable to and decouplable from the pin connector in a radial direction relative to the travel axis, the pin stem extending from the linear travel converter into the manifold when the actuator is coupled to the top clamping or mounting plate and the pin connector is received within the actuator coupling, the actuator being mounted on, to or within the top clamping or mounting plate for radial movement upon decoupling of the actuator from the top clamping or mounting plate such that the pin connector is decouplable from the actuator coupling upon said radial movement while the actuator is disposed on or within the mounting plate, the actuator being removable from on or within the mounting plate leaving the valve stem behind extending into the manifold.

The pin connector typically comprises an adapter coupled to a top or upstream end of the stem, the adapter configured to be reversibly receivable within the coupling in a radial direction. The adapter can comprise an enlarged head which is reversibly couplable to and decouplable from the coupling.

The apparatus is preferably adapted to allow the pin connector to travel a selected radial distance within the coupling and to remain coupled while the top clamping or mounting plate remains coupled to the mold and the pin stem remains extended into the manifold.

The pin stem is typically mounted to the manifold for radial movement of the pin stem together with the manifold relative to the top clamping or mounting plate.

The apparatus is preferably adapted to allow the adapter to travel a selected radial distance within the coupling relative to the axial path of travel while the mounting plate remains coupled to the mold, the pin connector remains coupled to the actuator coupling and the pin stem remains extended into the manifold.

The top clamping or mounting plate is typically decouplable from the mold leaving the pin stem extended into the manifold when the adapter is decoupled from the coupling.

The motor housing is preferably removably attached to the top clamping or mounting plate and the transmission housing is removably attached to the motor housing.

The transmission housing can be removably attached to the top clamping or mounting plate and the motor housing can be removably attached to the transmission housing.

The actuator is typically interconnected to a controller that includes instructions that instruct the actuator to drive the valve pin upstream continuously from the second position to the third maximum upstream position at one or more high rates of travel that are equal to or greater than the one or more intermediate rates of travel.

The apparatus can further comprise a position sensor that senses a position of either the actuator or the valve pin, the position sensor sensing the position of the actuator or the valve pin and sending a signal indicative of the position of the actuator or the valve pin to the controller;

the controller instructing the actuator to drive the valve pin continuously upstream from a first gate closed position to a second upstream position at a velocity that is less than a maximum velocity at which the actuator is capable of driving the valve pin.

The drive gear and the transmission gear can be rotatably interconnected via gears or via belt and pulley In another aspect of the invention there is provided a method of driving a valve pin in apparatus for controlling the rate of flow of fluid mold material from an injection molding machine to a mold cavity, the apparatus comprising a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, a pin connector and a stem, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the method comprising:

meshing and arranging the drive gear and the transmission gear such that the drive axis and the gear axis are disposed at a non-coaxial angle relative to each other and such that driven rotation of the drive gear rotatably drives the gear shaft around the gear axis, interconnecting a linear travel converter comprising a travel shaft having a travel axis to an upstream end of the liner travel converter and interconnecting the valve pin to a downstream end of the linear travel converter, adapting the interconnection between the converter and the gear shaft to convert rotation of the gear shaft to linear travel of the travel shaft along the travel axis, mounting the linear travel converter for controllable upstream and downstream linear travel together with the valve pin via the interconnection of the downstream end of the linear travel converter to the valve pin, removably attaching one or the other of the motor housing or the transmission housing to a top clamping or mounting plate that is mounted upstream of the manifold and fixedly interconnected to the mold.

The drive gear and the transmission gear are preferably rotatably interconnected via gears or via belt and pulley.

Preferably, the actuator is interconnected to a controller that includes instructions that instruct the actuator to drive the valve pin upstream continuously beginning from the closed position to one or more intermediate upstream positions at one or more intermediate rates of travel that are less than a maximum velocity at which the actuator is capable of driving the valve pin for either a predetermined amount of time or for a predetermined length of upstream travel.

Most preferably the controller includes instructions that instruct the actuator to drive the valve pin continuously upstream from the one or more intermediate upstream positions to a maximum upstream position at one or more high rates of travel that are equal to or greater than the one or more intermediate rates of travel.

The apparatus can further comprise a position sensor that senses a position of either the actuator or the valve pin, the position sensor sensing the position of the actuator or the valve pin and sending a signal indicative of the position of the actuator or the valve pin to the controller; the controller instructing the actuator to drive the valve pin continuously upstream from the one or more intermediate upstream positions at the one or more high rates of travel on detection by the position sensor of the valve pin at the one or more intermediate upstream positions.

The controller can include instructions that instruct the actuator to drive the valve pin at one or more high rates of downstream travel that are equal to or less than a maximum rate of downstream travel at which the actuator is capable of driving the valve pin when the valve pin is disposed at a maximum upstream position during the course of an injection cycle.

In such an embodiment, the controller typically includes instructions that instruct the actuator to drive the valve pin at one or more intermediate rates of downstream travel that are less than the one or more high rates of downstream travel on expiration of a predetermined amount of time or for a predetermined amount of downstream travel of the valve pin from the maximum upstream position.

In another aspect of the invention there is provided a method of driving a valve pin in apparatus for controlling the rate of flow of fluid mold material from an injection molding machine to a mold cavity, the apparatus comprising:

a manifold that receives an injection fluid mold material, the manifold having a delivery channel that delivers the injection fluid mold material under an injection pressure to a gate of a mold cavity disposed within a mold, the gate being controllably opened and closed by a valve pin having a pin axis, a pin stem and a pin connector, the valve pin being slidably mounted for reciprocal upstream and downstream linear movement along the pin axis such that a downstream end of the valve pin is drivable into and out of open and closed positions relative to the gate, an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a gear shaft rotatably mounted within a transmission housing, the gear shaft having a gear axis and a transmission gear drivably rotatable around the gear axis, the drive gear and the transmission gear being drivably interconnected and arranged such that the drive axis and the gear axis are non-coaxially mounted or disposed relative to each other and such that driven rotation of the drive gear around the drive axis rotatably drives the gear shaft around the gear axis, a linear travel converter comprising a travel shaft having a travel axis, the gear shaft being interconnected to an upstream end of the linear travel converter and the valve pin being interconnected to a downstream end of the linear travel converter, the linear travel converter having a pin coupling that is reversibly couplable to and decouplable from the pin connector in a radial direction relative to the travel axis, the interconnection between the converter and the gear shaft being adapted to convert rotation of the gear shaft to linear travel of the travel shaft along the travel axis, the linear travel converter being mounted for controllable upstream and downstream linear travel together with the valve pin via the interconnection of the downstream end of the linear travel converter to the valve pin, wherein one or the other of the motor housing or the transmission housing are removably attached to a top clamping or mounting plate that is mounted upstream of the manifold and fixedly interconnected to the mold, the method comprising:

decoupling the actuator from the top clamping or mounting plate, radially moving the actuator while the actuator is disposed on or within the top clamping or mounting plate a distance sufficient to decouple the pin connector from the pin coupling.

Such a method can further comprise removing the actuator from on or within the top clamping or mounting plate leaving the valve stem behind extending into the manifold.

BRIEF DESCRIPTION OF THE DRAWINGS

The above and further advantages of the invention may be better understood by referring to the following description in conjunction with the accompanying drawings in which:

FIGS. 10H-10M illustrate a series of method steps by which an actuator can be decoupled from a valve pin wherein FIG. 10H is a side schematic sectional view (similar to FIG. 10E) showing the actuator and valve pin assembly coupled and mounted in an injection molding apparatus.

FIG. 10I shows the housing of the actuator decoupled from the mounting or clamp plate.

FIG. 10J is a view similar to FIG. 10H after the actuator has been decoupled from the mounting plate and moved radially to the left to decouple the pin connector or adapter from the coupling at the downstream end of the actuator;

FIG. 10J is a view similar to FIG. 10I but showing the actuator to being removed from the mounting plate while the valve pin assembly remains behind extended into the manifold.

FIG. 10K is a view similar to FIG. 10J showing the actuator having been moved upstream to a position approaching being removed from within the recess provided in the top clamping or mounting plates in which the actuator is disposed when coupled to the plates.

FIG. 10L is view showing the actuator having been completely removed from its former position disposed within or on the mounting plate leaving the pin stem behind mounted to the manifold.

FIG. 10M is a view showing the top mounting or clamp plates having been removed or decoupled from the mold together with the actuator having been decoupled from the pin connector leaving the pin stem behind mounted to the manifold.

FIGS. 11A-11B show tapered end valve pin positions at various times and positions between a starting closed position as in FIG. 11A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 12A-12B show a system having a valve pin that has a cylindrically configured tip end, the tips ends of the pins being positioned at various times and positions between a starting closed position as in FIG. 12A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum;

DETAILED DESCRIPTION

Figure 1:
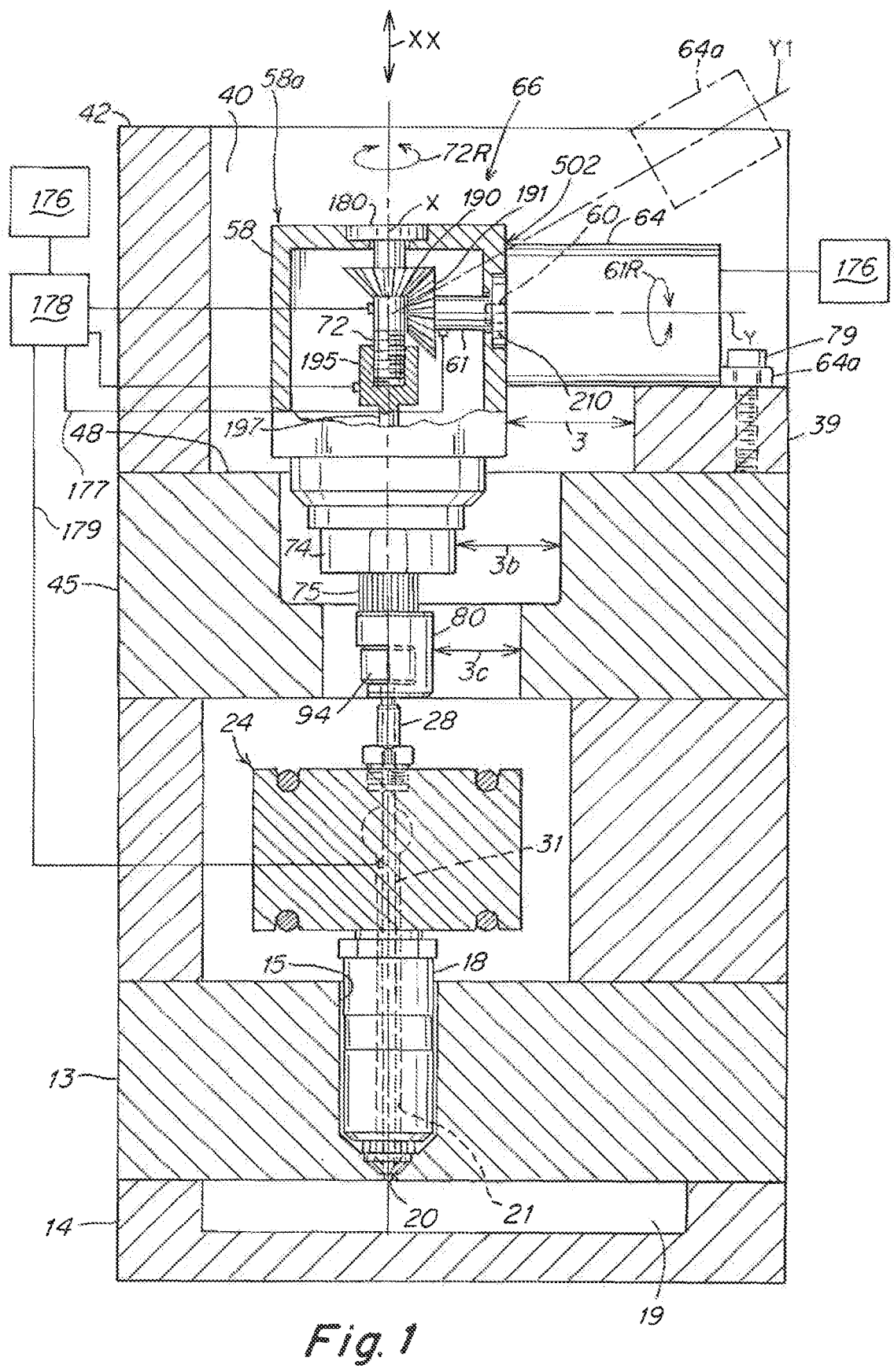
FIG. 1 is a schematic cross-section of an embodiment of the invention showing an actuator comprised of an electric motor and gear box where the housing of the motor is fixedly and removably attached to the upstream top clamping plate of the system.
Figure 2:
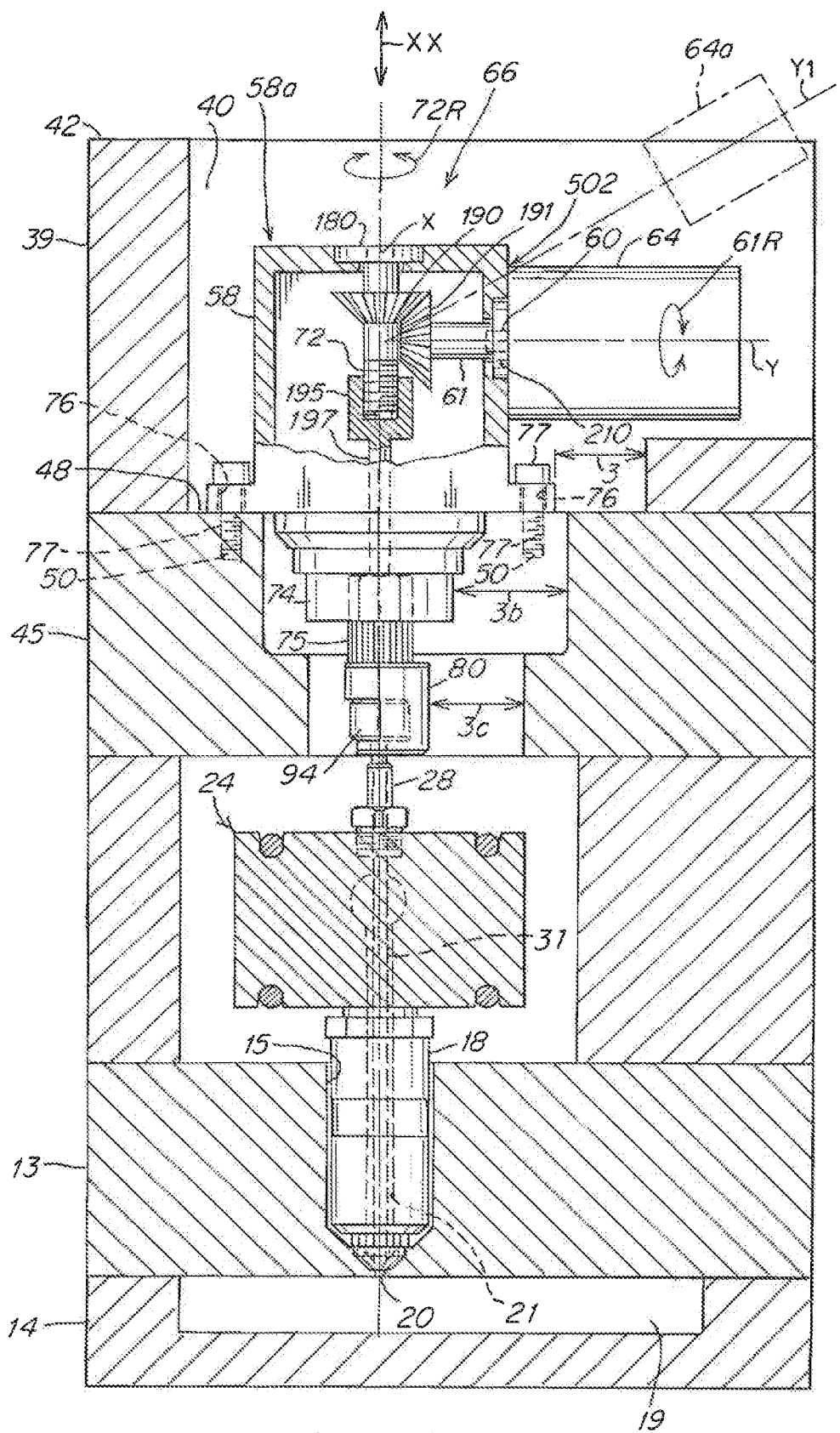
FIG. 2 is a schematic cross-section of another embodiment of the invention where the housing of the gear box is fixedly and removably attached to the upstream top clamping or mounting plate of the system.

FIGS. 1, 2 shows one embodiment of the invention comprised of an electric actuator 66 assembly that is comprised of an electric motor 64 drivably interconnected to a gear 72/190 in a non-coaxially aligned X-Y arrangement. The shaft 60 of the electrically driven motor 64 has an axis Y, the shaft 60 being rotatably driven by electrical power, the shaft 60 being interconnected to a valve pin 31 through a bevel gear engagement between the head 190 of a screw 72 and the head 191 of an extension member 61 of the motor shaft 60. As can be readily imagined, the screw component 72 can alternatively have threads along its length (in place of the beveled head 190) which mesh with a worm at the end of extension 61 (in place of the beveled member 191). As shown, the axis Y of the shaft 60 is non-coaxially perpendicular to the axis X of the pin 31 and the actuating screw mechanism 72 such that axial forces which may occur along axis X are not transmitted along axis Y to the shaft 60.

In the FIGS. 1, 2 embodiment, the screw 197 has a nut 195 integrally forming the end of the screw 197 which is drivably interconnected to, i.e. screwably engaged with, the actuating screw 72. The pin 31 is slidably mounted in a complementary aperture within manifold 24 for movement along its axis X within melt flow channel 120. The actuating screw 72 is mounted via disc 180 to housing 58 which is, in turn, fixedly mounted to mounting plate 45 such that screw 72 is drivably rotatable around axis X and axially stationary along axis X. Screw 72 is drivably rotatable around axis X via the screwable engagement between bevel gears 190,191. Shaft extension member 61 is coaxially connected to the motor shaft 60 (via rigid connection between connecting disc 210 and a complementary connecting member attached to shaft 60 which is not shown) such that as the shaft 60 is rotatably driven around axis Y the extension member 61 and its associated bevel gear 191 are simultaneously rotatably driven around axis Y. As can be readily imagined, as screw 72 is rotatably driven around axis X via the meshed bevel gears 190, 191, pin 31 is translationally driven along axis X via the screwable engagement between nut end 195 and screw 72. Thus the screw 72 acts as an actuating member to and through which axial forces are transmitted to and from pin 31.

Figure 3:
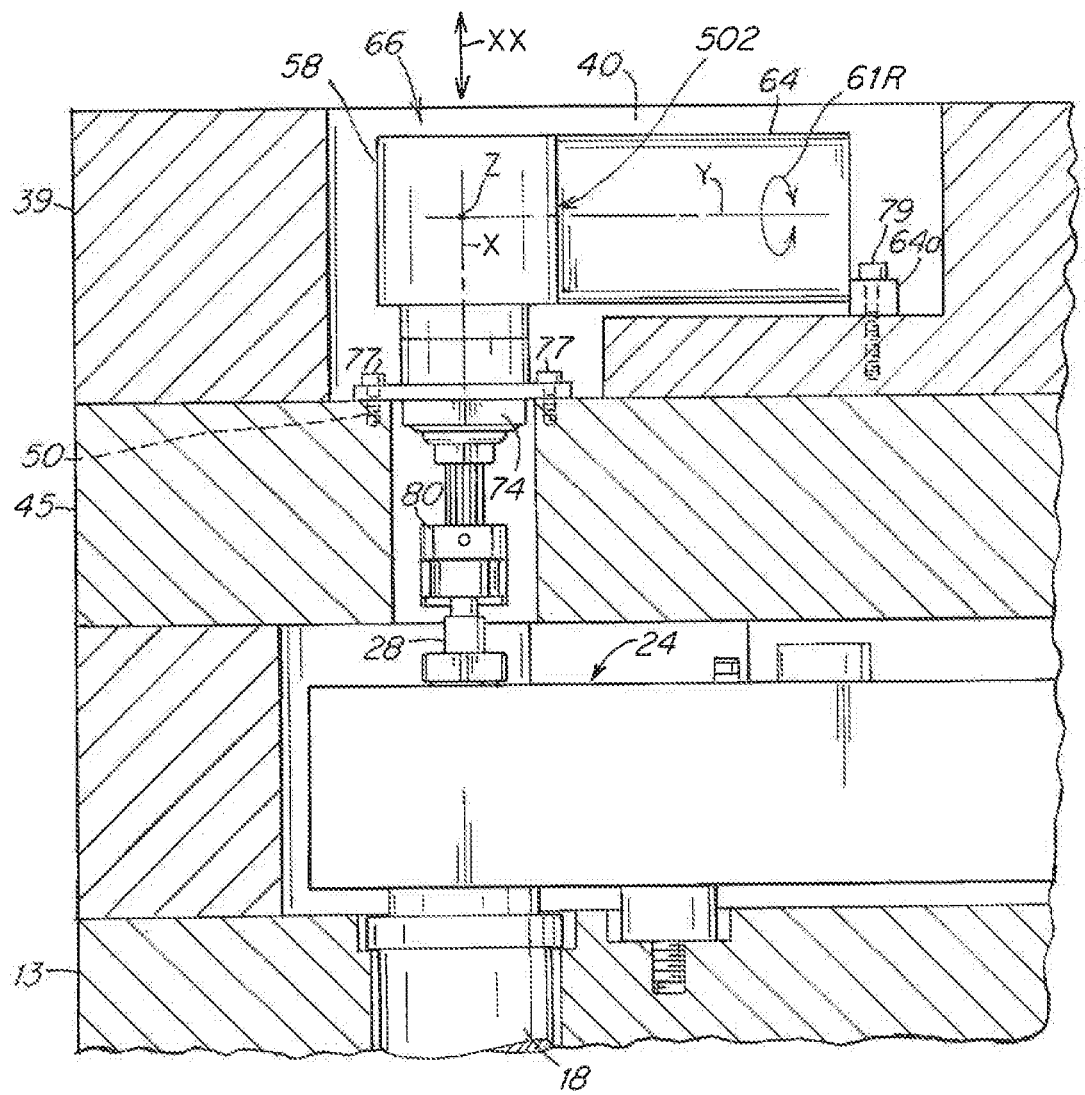
FIG. 3 is a cross-sectional view of an assembled injection molding system comprised of an electric actuator having a non-coaxial gear transmission according to the invention.
Figure 3A:
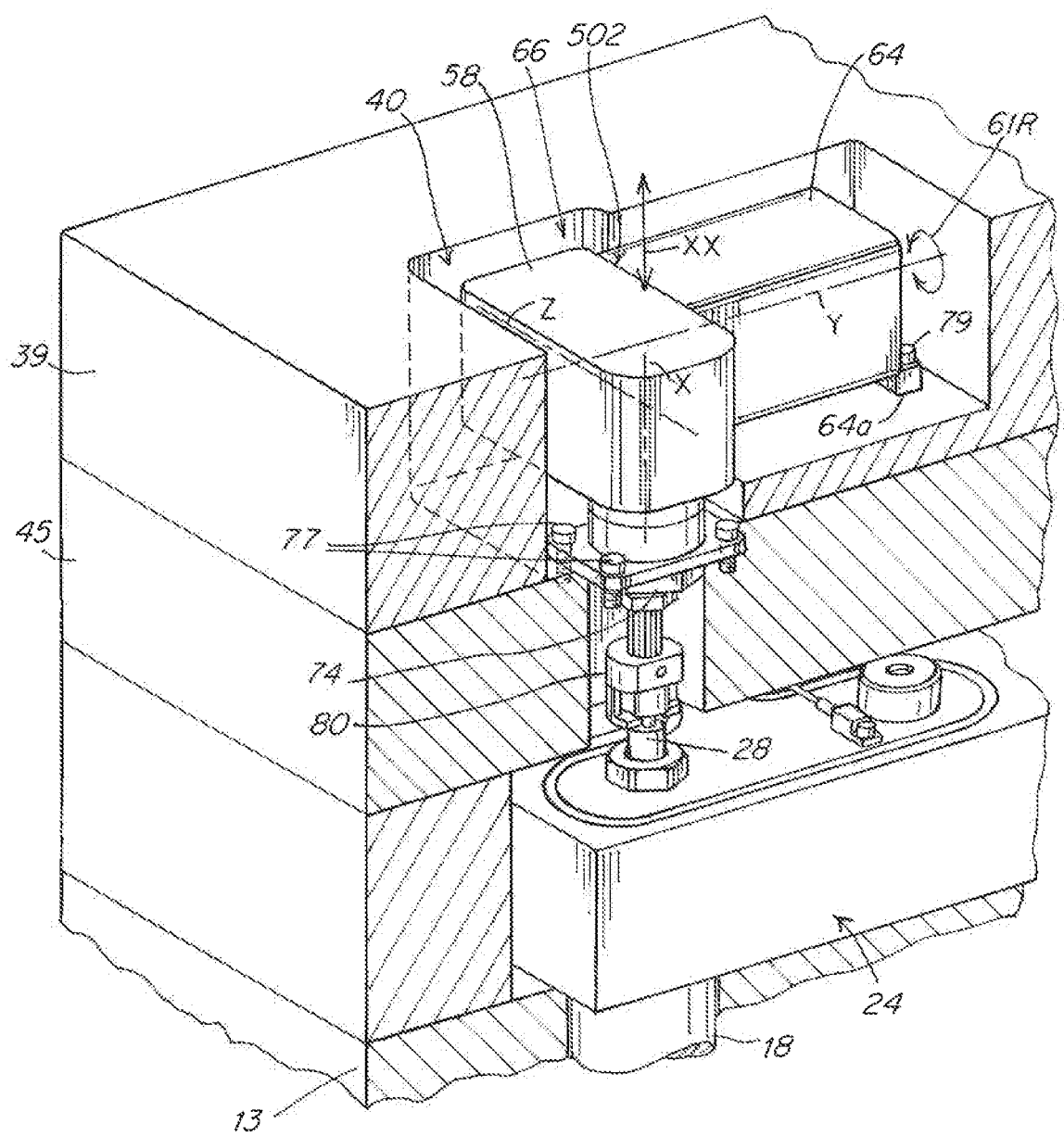
FIG. 3A is a perspective view of the FIG. 3 system.
Figure 3B:
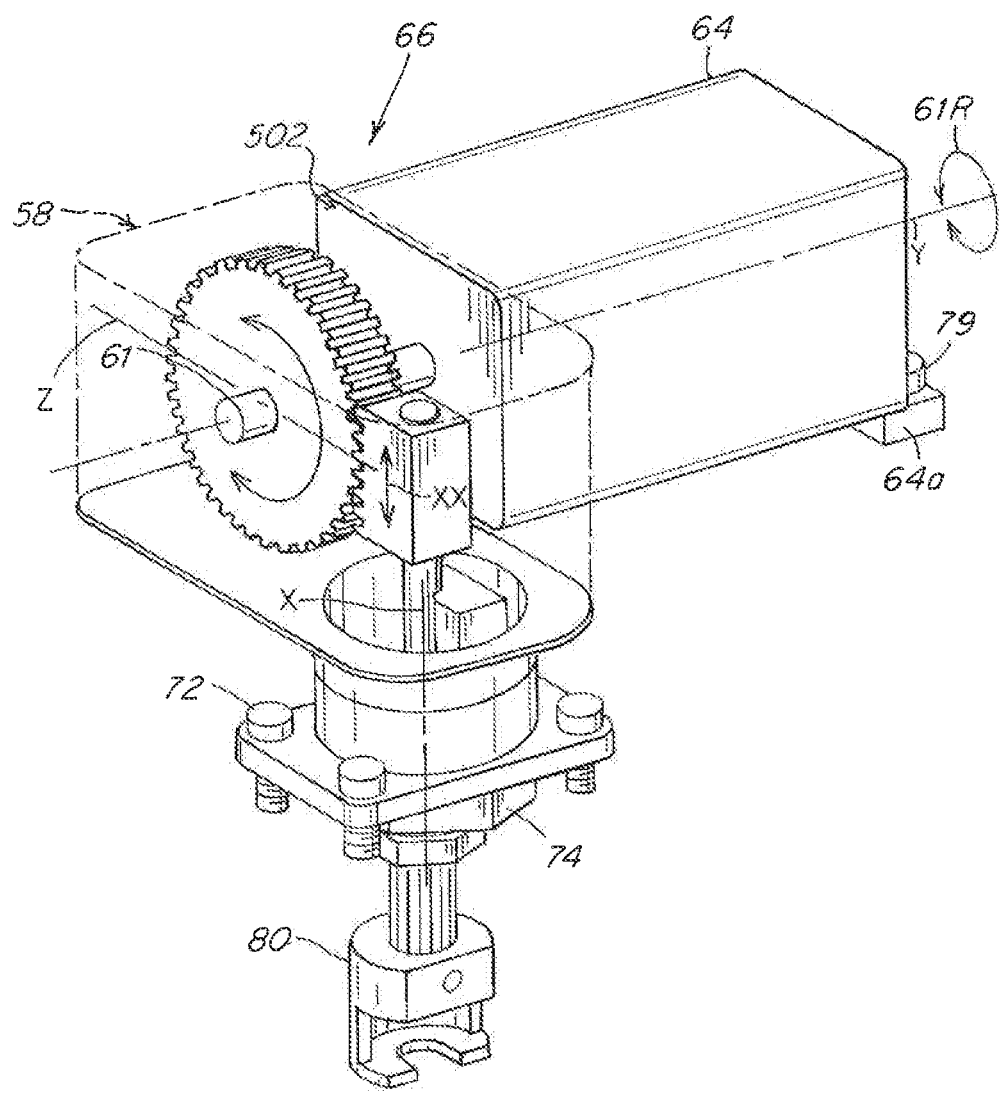
FIG. 3B is a perspective, partially cut-away view of the motor, motor housing and components that mount the housing and the valve pin of the FIG. 3 system.
Figure 4:
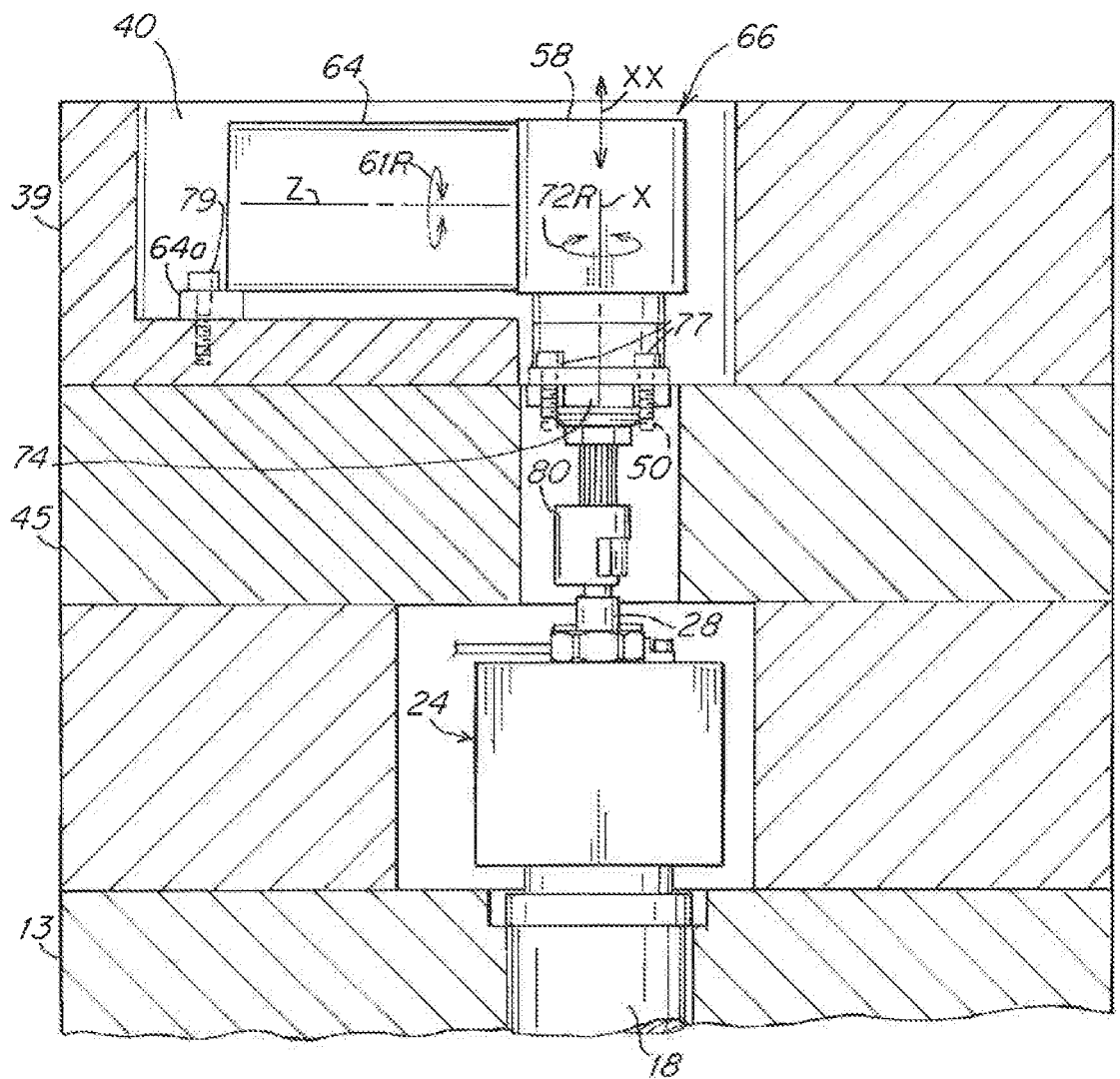
FIG. 4 is a cross-sectional view of an assembled injection molding system comprised of another embodiment of an electric actuator having a non-coaxial gear transmission according to the invention.

FIGS. 1, 3A, 3B, 4, 5 show an embodiment where the electric motor 64 component of the actuator 66 is coupled to the top clamp plate 39 via bolts 79 interconnecting motor housing portion 64a and plate 39. Complementary tapped holes are provided in the upper surface of the upper mounting plate 39 for receiving the bolts 79 and securing the motor housing 64 to the plate 39. This prevents rotational and other movement of the housing 64 and gear box housing 58 with respect to the mounting plates 39, 45 and manifold 24 and the injection molding apparatus generally. Extending downwardly from the screw 195 is a cylindrical projection 74 from which the downstream neck 75 of the coupler screw extends. Coupled to the downstream end of the neck 75 is the actuator coupling 80 and extending axially downstream from the coupling 80 is the valve pin 31. FIGS. 3, 4 show an alternative mounting of the motor housing 64 to the top clamp plate 39 via an extension 64a and bolt 79, as alternative to the mounting of the transmission gear housing 58 to the top clamping or mounting plate 45 via bolts 77.

FIGS. 2, 6, 7, 8, 9 show an alternative embodiment where the gear box 58 includes four bores 76, one in each corner of the housing, for receiving bolts 77 that removably couple the gear box housing 58 to the lower mounting plate 45. Four complementary tapped holes 50 are provided in the upper surface 48 of the lower mounting plate 45 for receiving the bolts 77 and securing the gear box housing 58 to the plate 45. This prevents rotational and other movement of the housing 58 and its attached motor 64 with respect to the mounting plates 39, 45 and manifold 24 and the injection molding apparatus generally. Extending downwardly from the screw 195 is a cylindrical projection 74 from which the neck 75 of the coupler screw extends. Coupled to the downstream end of the neck 75 is the actuator coupling 80 and extending axially downstream from the coupling 80 is the valve pin stem 31. FIGS. 2-10 all show one alternative arrangement where the gear housing 58 is bolted 77 to the top clamp or mounting plate 45 as an alternative to mounting of the motor housing 64 to the top clamp or mounting plate 39.

As can be readily imagined the housings 58 and 64 are fixedly connected to each other by conventional attachment mechanism 502 such that when one of the housings 58 or 64 is fixedly bolted 77 or 79 to a clamp or mounting plate 39, 45, the other of the two housings 58 or 64 is fixedly mounted to the same plate via fixed connection between 502 the two housings 58, 64.

FIGS. 1, 2 show the actuator 66 comprised of a transmission assembly 58a that is comprised of a gear box 58 assembled together with the other components of the system to form a stack that includes a nozzle 18 mounted in a receiving well 15 formed within a mold plate 13 in an injection molding stack arrangement. As shown a heated manifold 24 is disposed between the pair of upstream top clamping or mounting plates 39/45 and the downstream mold plates 13/14. The valve pin 31 is mounted to the manifold within a bushing 28 having a complementary internal bore for slidably receiving the pin 31 such that the pin can reciprocally travel XX along axis X. The valve pin 31 has a downstream distal tip end that opens and closes a gate aperture 20 that leads to the mold cavity 19. In use, the mounting plates 39, 45 and mold plates 13, 14 are fixedly secured together under high clamp pressure, so as to withstand high injection molding forces. A nozzle 18 extends through a bore 15 in the lower mold plate 14, and seats and unseats in the gate 20 to the injection mold cavity 19. The actuator 66 is disposed in a chamber 40 of the upper mounting plate 39, with a radial clearance 3 provided in at least one radial direction so as to facilitate the radial coupling and decoupling of the pin head adapter 94 and actuator coupling 80. Similarly, there is a radial clearance 3*b*/3*c* to allow the projecting neck 75 and adapter 80 to move radially in the plates.

As described in U.S. Pat. No. 6,294,122 (the disclosure of which is incorporated herein by reference in its entirety as if fully set forth herein) the electric motor is powered and driven by electrical energy or power input to coils that typically rotatably drive a magnet that in turn rotatably drives motor shaft 61.

In the FIGS. 1, 2 embodiment, the distal end of the rotor 61 of the motor 64 has a beveled gear head 191 that meshes with and rotatably drives a beveled gear head 190 formed on the shaft of a linear travelling XX screw 72 (linear travel converter) that comprise the transmission assembly 58*a*. As shown, the gear head 190 is integrally formed together with a shaft having a downstream end that has male threads forming a screw 72 that is screwably engaged within the female screws bored within the upstream head 195 of a linear conversion screw 197. The downstream distal end of the screw 197 is connected to actuator coupling 80 which removably receives the upstream head portion 94 of valve pin 31 as described in detail in U.S. Pat. No. 8,091,202. The driven rotation motion 61R of motor shaft 61 is thus converted from rotatable motion to controllably driven linear motion XX along axis X of the valve pin 31 via the driven rotation of the gear screw 72 and driven linear movement of the linear conversion screw 197 via the screwable engagement of screw and head 195.

As shown in FIGS. 1, 2 the arrangement or disposition of the motor axis Y is non-coaxial to the axis X of the transmission gear and screws 72, 195, 197 and valve pin 31. As shown the arrangement of the axes X and Y can be about 90 degrees relative to each other. Alternatively, the axis Y1 of the drive shaft can be disposed at any non-coaxial angle between zero and 180 degrees relative to the axis X of the transmission and valve pin, the design of the meshed gears 190, 191 being adapted to enable such an arrangement.

FIGS. 3A, 3B shows another gearing arrangement where a circular gear 800 attached to distal end of motor drive shaft 61 is controllably rotatably drivable 61R around axis Y to drive XX the gear rack 802 (linear travel converter) along axis X via meshing of the gears of gear 800 with the gears of rack 802, the rack 802 being fixedly attached to the upstream end of a linear traveler rod 197*a* that is interconnected at its downstream end to coupler 80. Thus the valve pin when coupled to coupler 80 is controllably drivable along the X axis by controlled driving of the shaft 61 of the motor around the perpendicular axis Y.

Figure 5:
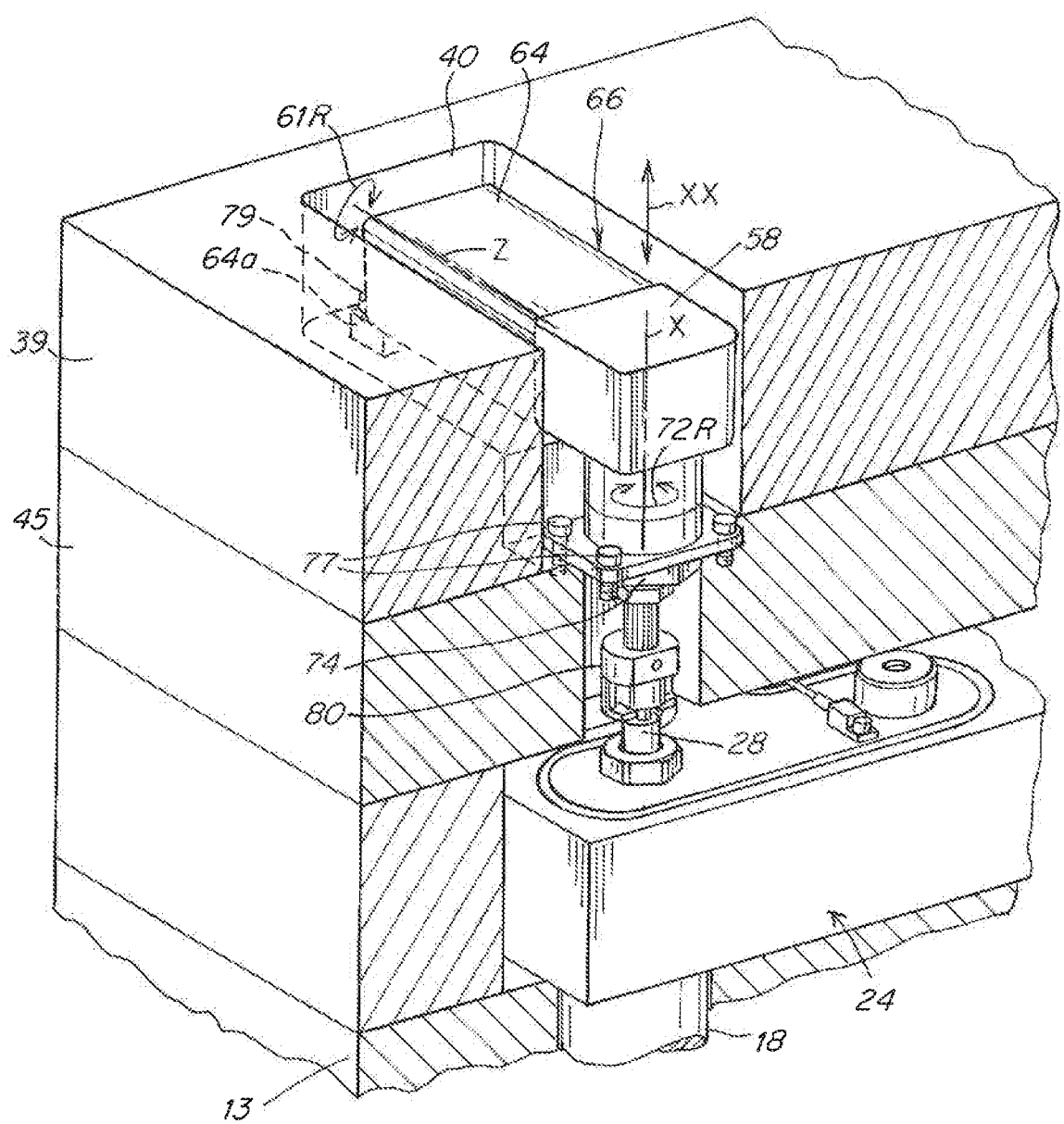
FIG. 5 is a perspective view of the FIG. 4 system.
Figure 6:
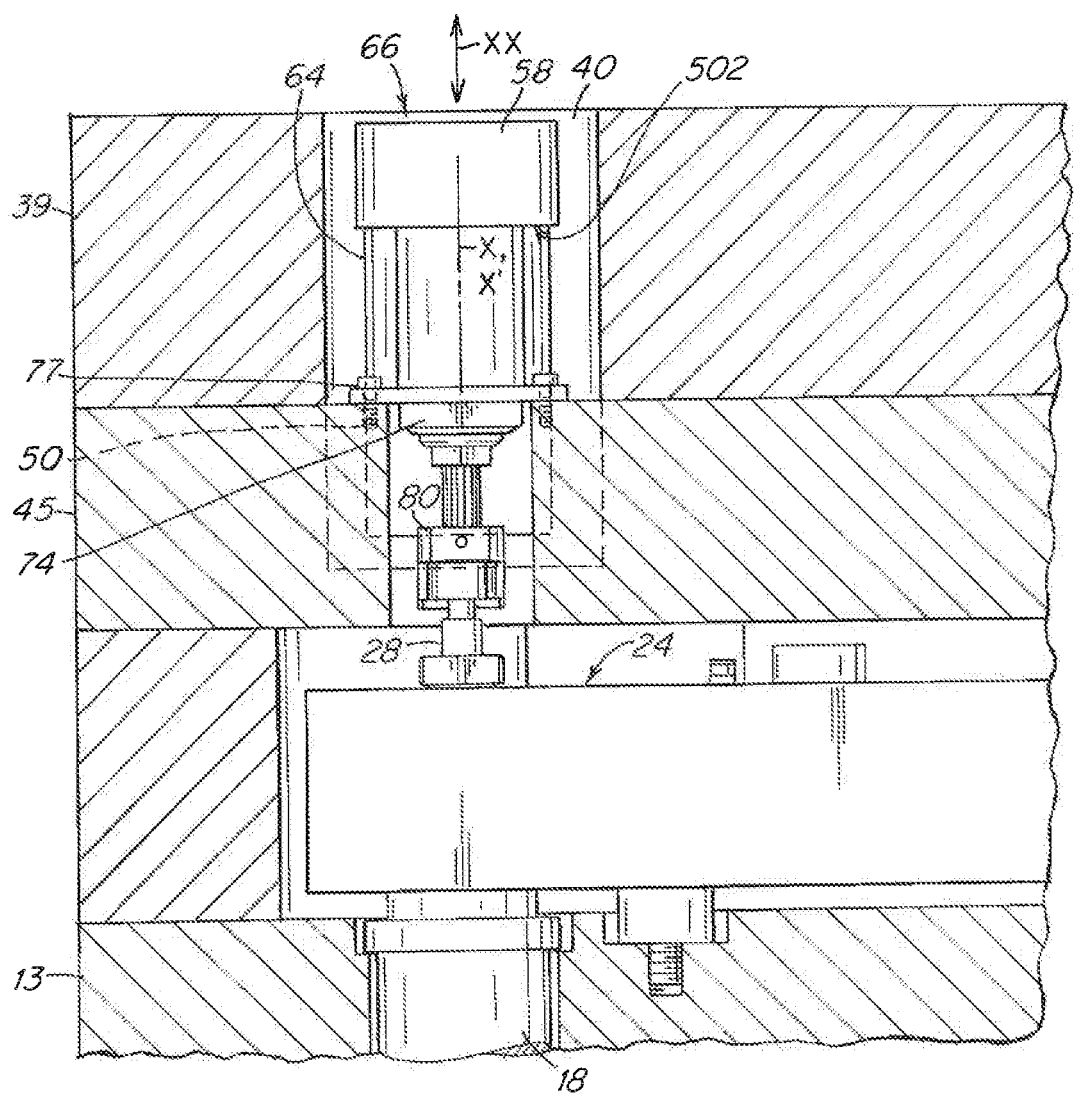
FIG. 6 is a front cross-sectional view of an assembled injection molding system comprised of another embodiment of an electric actuator having a non-coaxial gear transmission according to the invention.
Figure 7:
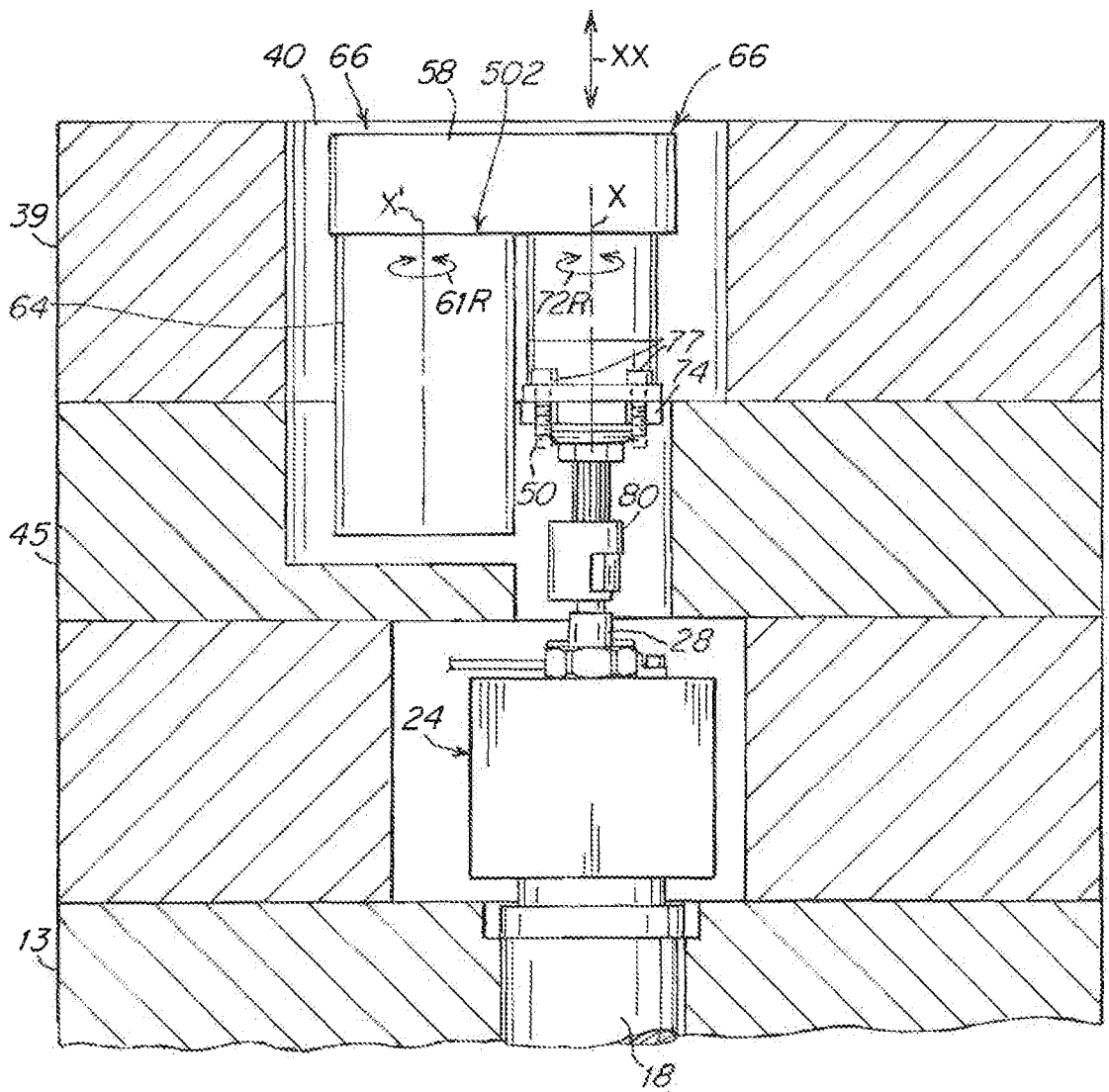
FIG. 7 is a side view of the FIG. 6 system.
Figure 8:
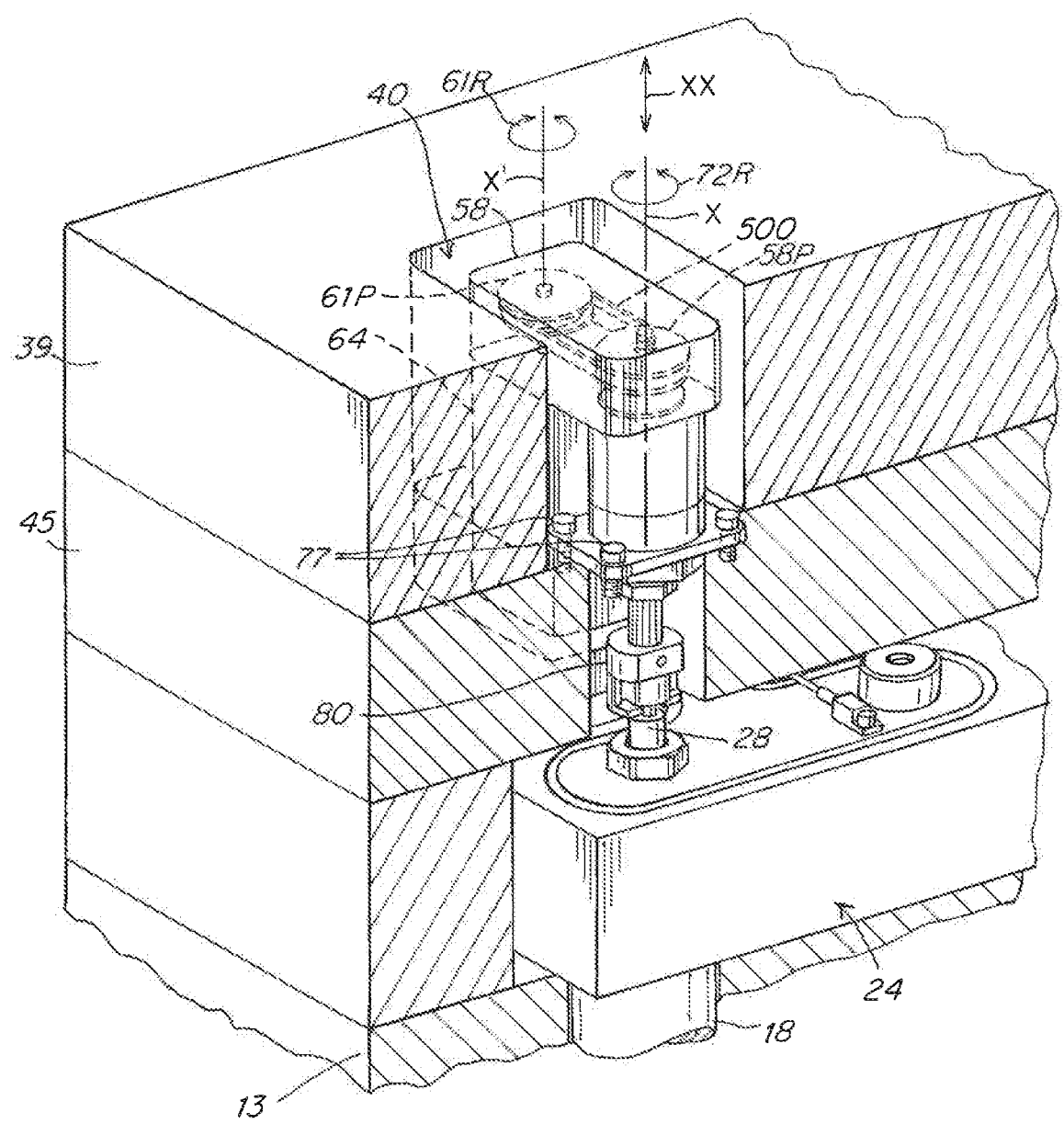
FIG. 8 is a perspective view of an assembled injection molding system comprised of another embodiment of an electric actuator having a non-coaxial gear transmission with the motor shaft and transmission assembly shaft connected via pulleys and a belt according to the invention.

In another alternative embodiment shown in FIGS. 4, 5, 6 the motor 64 housing (or the gear box housing 58) could be mounted to the top clamping plate or mounting plate in an arrangement such that the drive shaft 61 of the motor 64 is aligned along the Z axis and a gear attached to the distal end of the shaft is meshed with a complementary gear at the upstream end of a complementary linear travel converter screw or rod similar to those described above regarding the FIGS. 1-3B embodiments to drive the valve pin along the non-coaxial axis X.

In the FIGS. 5-9 embodiments, driven rotation movement 61R of a motor shaft 61 is similarly converted to linear movement XX via interconnection of the motor shaft 61 to a pulley 61P and interconnection of the transmission shaft to a transmission pulley 58P with the two pulleys 58P, 61P being rotatably interconnected by belt 500. In such an embodiment, the axis Y of the motor rotor 61 is non-coaxial to the axis X of the transmission, the axes X and Y shown as being disposed at 180 degrees to each other. Other non-coaxially aligned arrangements of the axes X and Y, other than 180 degrees, can be assembled using appropriate components to interconnect pulleys 58P, 61P.

Figure 9:
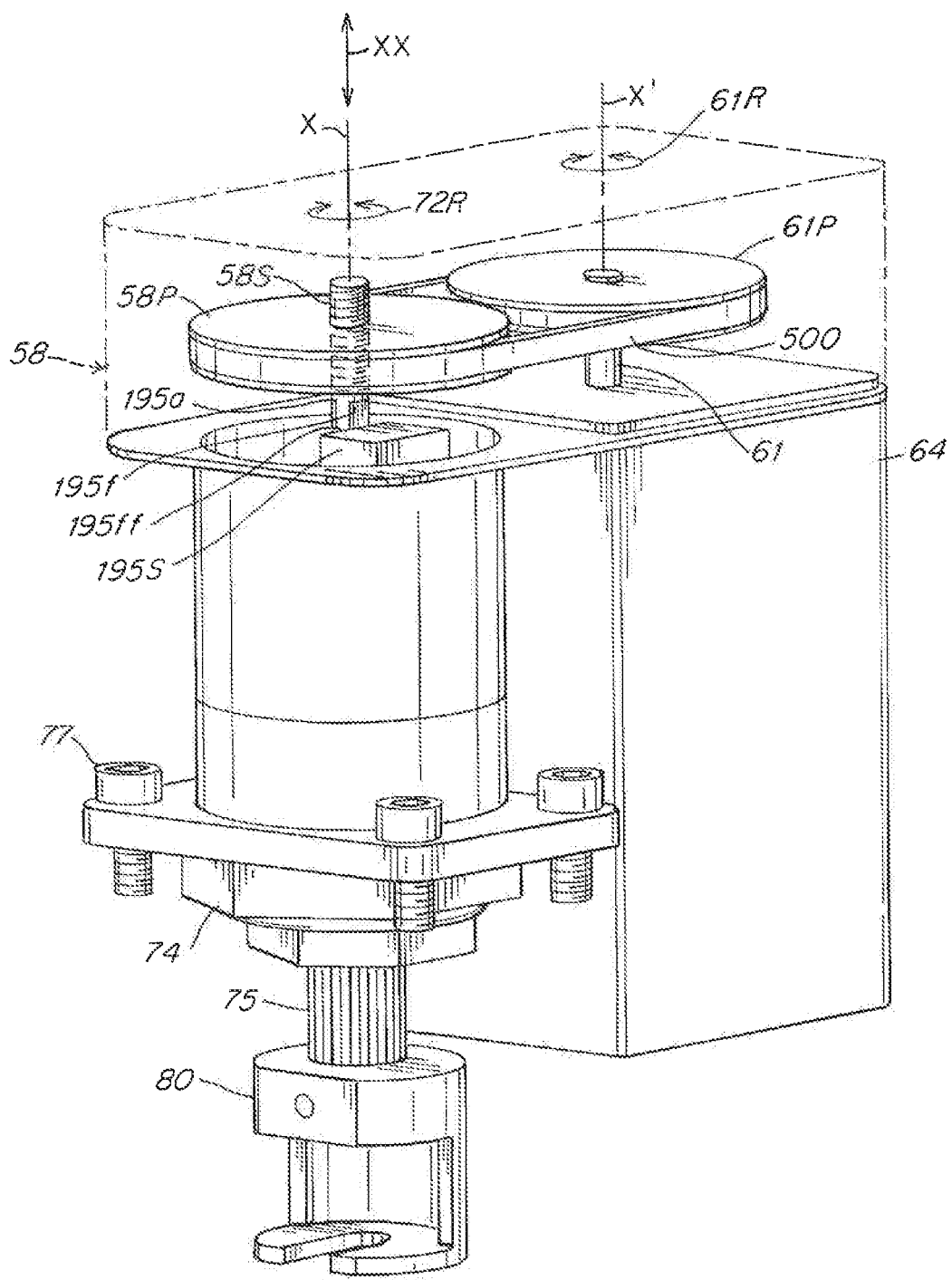
FIG. 9 is a perspective view an electric actuator similar to the FIG. 8 actuator where the transmission shaft has a downstream travelling axial shaft that is interconnected to an upstream rotatable shaft, the upstream travelling shaft being adapted to be non-rotatable.

FIG. 9 shows an embodiment where the transmission pulley 58P has a central internal thread that screwably receives a complementary threaded screw shaft 58S that is driven axially XX by rotation of the pulley 58P. The downstream end of the screw shaft 58S is interconnected to a downstream linear drive stem 195*a* which is interconnected to or otherwise forms the valve pin 31 of the system. The drive stem 195*a* is driven linearly XX along X by screw shaft 58S. The drive stem 195*a* is adapted to be non-rotatable by formation of a flat surface 195*f* on the outer circumference of the stem 195*a* and by mounting a stationarily mounted stop member 195S having a complementary flat surface 195*ff* that is engaged against the flat surface 195*f* of the stem 195*a* to prevent rotation thereof. The stem 195*a* can be a separate part or can be formed as integral with the valve pin itself, in either case the valve pin being non-rotatably by virtue of the flats 195*f,* 195*ff.*

An electronic controller 176 can be interconnected to the electric motor. Such a controller is capable of precisely driving the electric coils according to any pre-programmed electronic program, circuit or microcontroller to in turn precisely drive the valve pin to any selected positions along the axis X such that the position of the tip end of the valve pin relative to the gate is precisely controlled over the course of an injection molding cycle.

A position sensor 178 can be used to sense the position of any component of the system that relates to the axial X of the valve pin 31. Such a sensor 178 can sense 177 the rotational or axial position of the transmission gear 190, 72, the transmission linear conversion screw 195, the axis of the rotor 61 of the motor 64 such, the internal screw within the motor that drives the rotor or the magnet that drives the rotor 61, or the position sensor can alternatively sense 179 the axial position of the valve pin 31 itself. The signal 177, 179 that indicates position is input to the controller 176 which can use such a real-time signal in a program to control the rate of drive of the motor rotor 61 and transmission components 190, 72, 195 which in turn control the velocity or rate of travel of upstream withdrawal or downstream closure of the valve pin 31 at selected times or over selected lengths of time over the course of an injection cycle.

With reference to FIGS. 10A-10M, the actuator assembly 66 is generically depicted as a box 66 for purposes of explanation as to how an assembly 66 as described above can be coupled, decoupled and moved laterally and upstream-downstream within a complementary receiving recess provided within plates 39, 45 such that the pin coupling can be coupled to and decoupled from the pin connector without having to dissemble the plates 39, 45 or the actuator 66. Although FIGS. 10A-10M depict the actuator 66 as a single parallelepiped shaped box, the box 66 as shown in FIGS. 10A-10M is analogous to the differently shaped assemblies 66 as described with reference to FIGS. 1-9 at least regarding how the assembly can be coupled, decoupled and moved within the recess 40 formed within plates 39, 45.

As shown in FIGS. 10A-10M the nozzle 18 is mounted in or on one or more metal (e.g. stainless steel) plates. The apparatus includes a heated manifold 24 and one or more other spacer, mounting or mold plates 13, 14. The manifold 24 is heated to maintain the nozzle 18 at an elevated temperature for delivery of the molten plastic. The mold cavity 19 and plates 13, 14 are typically maintained relatively cool by water cooling channels compared to the manifold 24 to enable solidification of the injected molten plastic to form a solid plastic article within the cavity of the mold.

The nozzle 18 is an elongated tubular article 19 typically made of stainless steel and having a central axial bore 21 through which the molten plastic travels to the gate 20 and into the mold cavity. Also in the nozzle bore, aligned along the central bore axis, is an axially elongated valve pin 30 having an axially elongated stem 31, which defines the valve pin axis AA. At one end of the stem, designed to seat and unseat in the nozzle gate for purposes of opening and closing the gate, and effectively starting and stopping flow of the molten plastic to the mold cavity, the stem has an angular or tapered lowermost tip 32. At the opposite or upstream (top) end 33 of the valve stem 31 is a pin head 34 which in the present embodiment comprises a radially enlarged cylindrical member that is receivable within a pin head adapter 94. The valve stem 31 also extends through an elongated plastic feed bore 27 in the heated manifold 24, typically also substantially coaxial with the nozzle bore. The valve stem 31 is guided into and mounted to the manifold 24 by a bushing 28 which receives, guides and mounts the valve stem 31 in the manifold plastic feed bore 27. The pin head 34 and any associated adapter 94 extends axially upstream beyond and from the bushing on the upstream or top side 25 of the manifold.

The pin head 34 may be formed integral with the valve stem 33 (as a single part) or it may be formed as a separate part and then secured to the upstream or top end of the valve stem by conventional means. It may or may not be radially enlarged but is typically formed in a radially enlarged configuration for ease of ready connectivity to and disconnectivity from an adapter component or pin coupling as described below.

Above/upstream of the manifold 24, a pair of upper and lower mounting plates 39, 45 are provided in or on which the actuator 66 is mounted. The plates 39 and 45 are sometimes referred to as top clamping plates, clamping plates or backing plates. The actuator 66 via the transmission drives the valve pin stem axially A, X (linearly) along the coaxial bores of the manifold and nozzle. The housing of the actuator assembly 66 is disposed within a receiving aperture or chamber 40 in the upper mounting plate 39 and/or a chamber 40a in the lower mounting plate 45. As discussed above the assembly 66 can be fixed to the lower mounting plate 45 by threaded bolts 77 which extend into complementary threaded holes 50 in plate 45 so as to removably couple the actuator housing to the mounting plate 39 (see FIG. 10F). In alternative embodiments as discussed above the actuator housing can be attached via bolts 79.

The mounting plates 39, 45 are removably coupled to the mold typically by bolts or similar reversible fastening mechanisms. The chamber 40 of the upper mounting plate 39 (in which the actuator 66 is disposed) is actually a through bore in the upper plate 39 extending from the top surface 42 to the bottom surface 43. The neck 75 extends downwardly into a co-axial bore 40a/40b in the lower mounting plate 45 (40/40a/40b are coaxial).

A pin coupling 80 is attached to or mounted on the neck 75 and is also disposed in the bore 40a/40b of the lower mounting plate 39 when the actuator is connected to the mounting plate. The coupling 80 includes a radial recess 83, disposed laterally (traverse to the elongated valve pin axis. The recess has a radial recess opening 82 that allows a pin head 34 or pin head adapter 94 to be radially inserted into and removed from the radial recess. The coupling 80 also includes a radial slot 84, connected (open) to the radial recess and extending downwardly to the lower surface 90 of the coupling 80. The radial slot has a radial slot opening 85 through which the valve stem 31 can be readily radially inserted or translated within (or removed from) the slot 84 while the adapter 94 is simultaneously radially inserted or translated within (or removed from) the radial recess 82. The coupling 80 has walls 91 that form and act as a housing for the radial recess 83 and radial slot 84. As shown, the pin connector 94 and the recess 83 and recess opening 84 are configured to have a complementary geometry, size, shape and configuration so as to enable the pin connector to be received within the recess 83 and fully surrounded and contained within walls 91 and also to require that the pin connector 94 is receivable within and removable from the recess 83 only by movement of the pin connector 94 in a radial direction R, FIG. 10B, transverse to the axial path of travel A of the neck 75. The pin connector 94 is slidable by manual force along radial direction R into and out of the recess 83 and recess opening 84. As shown when the pin connector 94 is slid into and out of recess 83 and opening 84, the pin stem 31 is simultaneously slidable radially through slot opening 85 into slot 84. The walls 91 act to retain and couple the pin connector 94 and associated pin stem 31 to the neck 75 when the connector 94 is received within recess 83 and stem 31 in slot 84.

In addition, the radial recess 82 is sized and configured to provide a radial clearance 2 in all radial directions between the valve pin adapter 94 and the recess 82 when/while the adapter is received and coupled within the recess 82 of the coupling 80. This radial clearance 2 allows movement in any radial direction of the valve pin adapter while it is mounted in the recess of the actuator coupling, so as to accommodate differences in thermal expansion between various components of the injection molding apparatus such as between the manifold 24 and the mounting plates 39, 45. As previously described, the valve stem 31 is mounted to a manifold 24 when the system is assembled, the manifold being heated during the course of startup to a higher temperature than the relatively cold mounting plates 39, 45 and cold actuator 66. During the time when the manifold 24 is being heated to a higher temperature than the mounting plates and actuator, it is desirable to provide a radial clearance to allow the valve pin assembly (pin 30 and adapter 94), which is mounted to the manifold by the bushing 28 and travels radially therewith and is also being heated via the manifold, to move radially together with the manifold with respect to the mounting plate and the axial path of travel of the actuator so as to prevent the application of undesirable side bending forces on the valve pin assembly. These side forces may bend or break the valve stem or otherwise interfere with proper alignment and operation of the valve pin assembly and actuator.

Figure 10A:
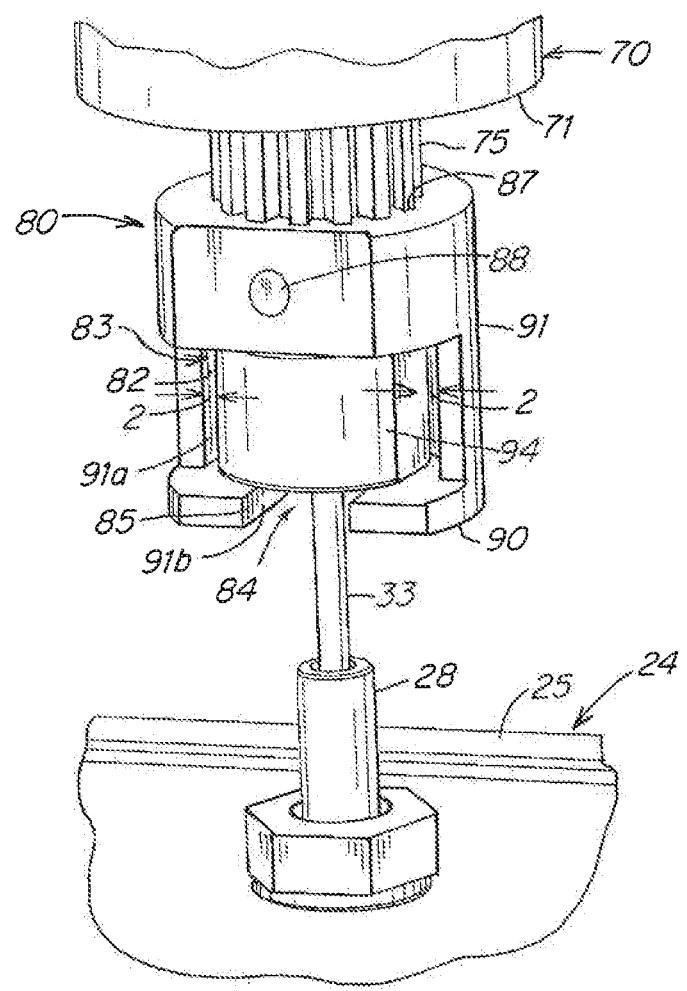
FIG. 10A is an exploded partial schematic view of the pin coupling components of the apparatus shown in FIGS. 1-9, in an assembled state.
Figure 10B:
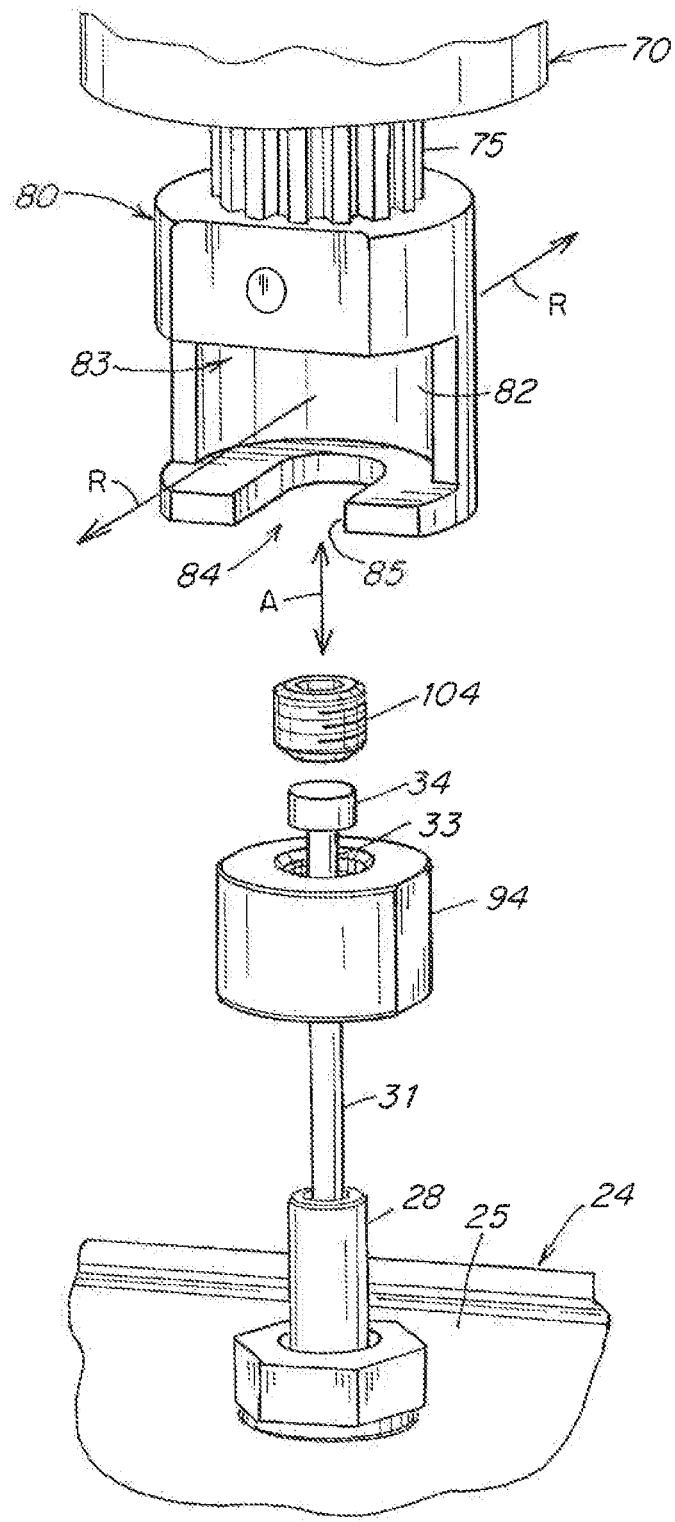
FIG. 10B is an exploded partial schematic view showing the pin coupling components of the apparatus shown in FIGS. 1-9, in a disassembled state.
Figure 10C:
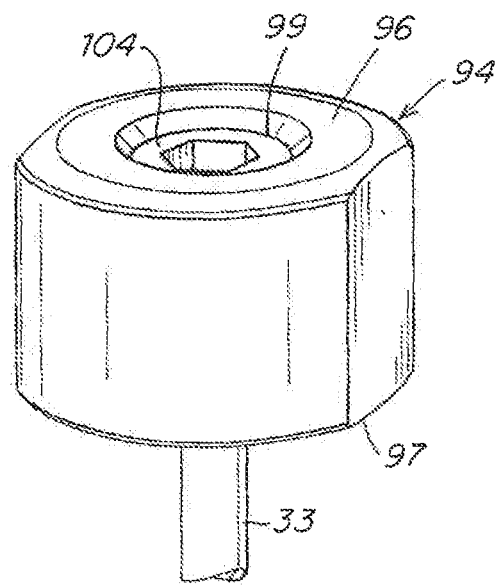
FIG. 10C is an enlarged schematic view of a valve pin head and a pin head adapter, in an assembled state, according to one embodiment.
Figure 10D:
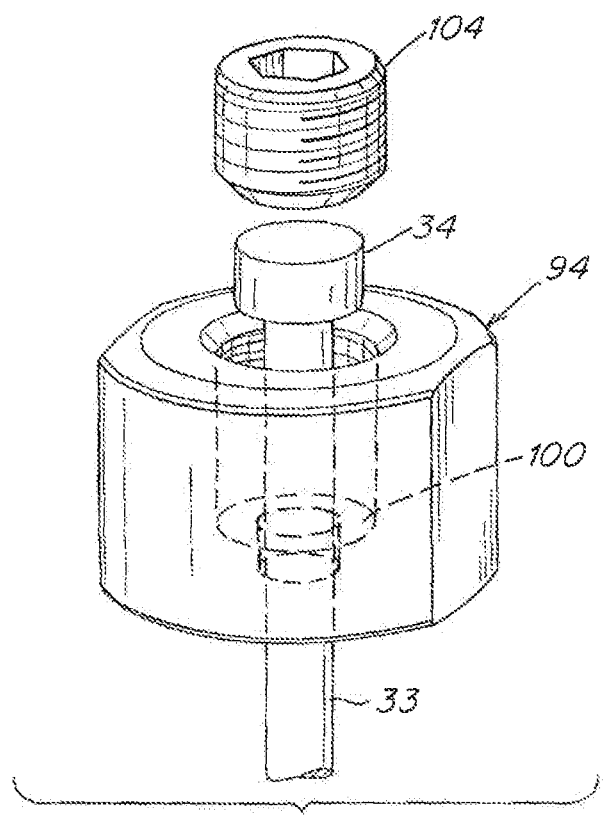
FIG. 10D is an exploded view of the pin head and adapter of FIG. 10C in a disassembled state.

FIGS. 10A, 10B show one embodiment of the coupling apparatus in an assembled state (FIG. 10A) and a disassembled state (10B). In FIG. 10A, the upper end of the valve pin is shown extending upwardly from a manifold bushing 28 secured to the top 25 of the manifold. The pin head 34 and attached adapter 94, at the top end of the valve pin, are disposed completely within the coupling 80 in FIG. 10A. The adapter 94 is radially received in the radial recess 82 of the coupling 80, while the valve stem 31 resides in the radial slot 84 of the coupling. There is a radial clearance 2 provided between the interior surface 91a of the walls 91 defining the radial recess 82 and outside surface of the adapter 94, and between the walls 91b defining the radial slot 84 and valve stem 31, to allow for radial movement of the valve pin assembly (here the valve stem 31, pin head 34 and pin head adapter 94) with respect to the axial drive path A of the actuator 66. The actuator coupling 80 is connected to the spline shaft or neck 75 that is interconnected to the electric actuator motor, by a pin 88 which extends through a bore 87 in the coupling and into a bore in the shaft. This prevents rotation of the coupling relative to the actuator shaft.

FIG. 10B shows the disassembled pin coupling 80 and pin head adapter 94. A cylindrical set screw 104 having outer threads is adapted for threaded engagement with the pin head adapter 94. This is further illustrated in FIG. 10C-10D. The pin head adapter 94 has a central axial through bore 99 extending from the top surface 96 to the bottom surface 97 of the adapter. The bore receives the upper end of the valve stem and pin head 34. The pin head 34 sits on a shoulder 100 in the central bore and is secured in the adapter 94 by screwing the set screw 104 into a threaded upper portion of the bore, creating a pressure engagement of the pin head and adapter. In this embodiment, the adapter essentially functions as an enlarged pin head. In another embodiment, the adapter may not be required, as the pin head itself could be disposed in the radial recess of the actuator coupling.

Figure 10E:
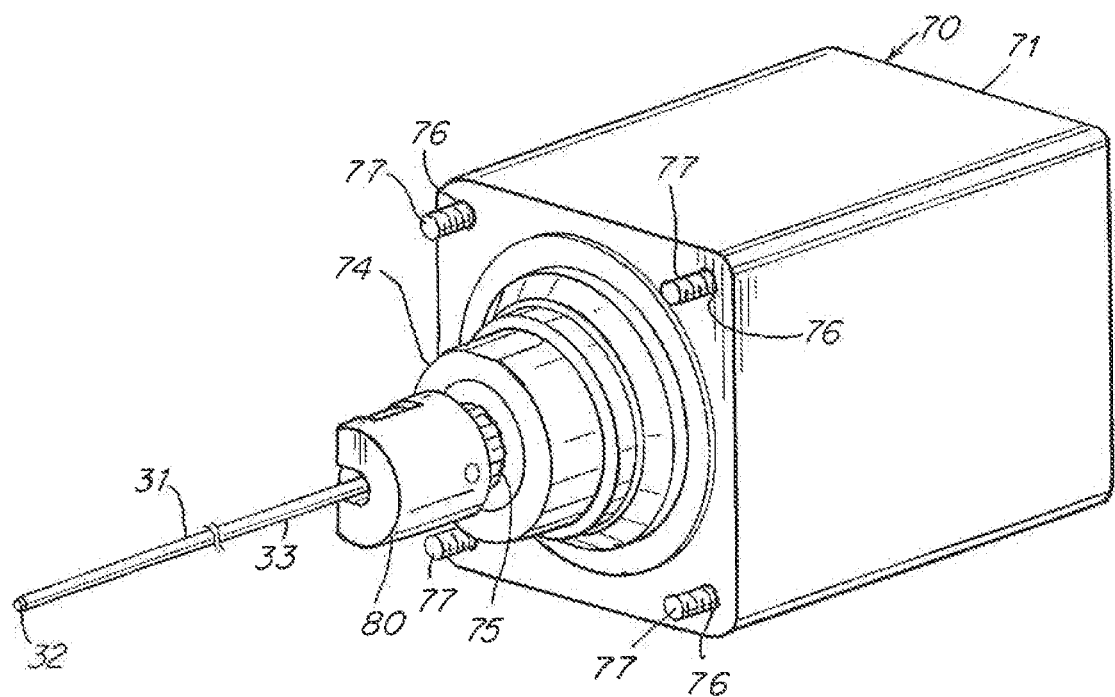
FIG. 10E is a perspective view of one embodiment of an electric actuator coupled to a valve pin.

FIG. 10E shows the actuator housing including four bores 76, one in each corner of the housing, for receiving bolts 77 that removably couple the motor or gear housing 58, 64 to the lower mounting plate 45. Four complementary tapped holes 50 are provided in the upper surface 48 of the lower mounting plate 45 for receiving the bolts 77 and securing the motor housing to the plate. This prevents rotational and other movement of the housing of the motor with respect to the mounting plates and manifold and the injection molding apparatus generally. Extending downwardly from the motor or gear housing 58, 64 is a cylindrical projection 74 from which the neck 75 extends. Coupled to the downstream end of the neck 75 is the actuator coupling 80 and extending axially downstream from the coupling 80 is the valve stem 31.

Figure 10F:
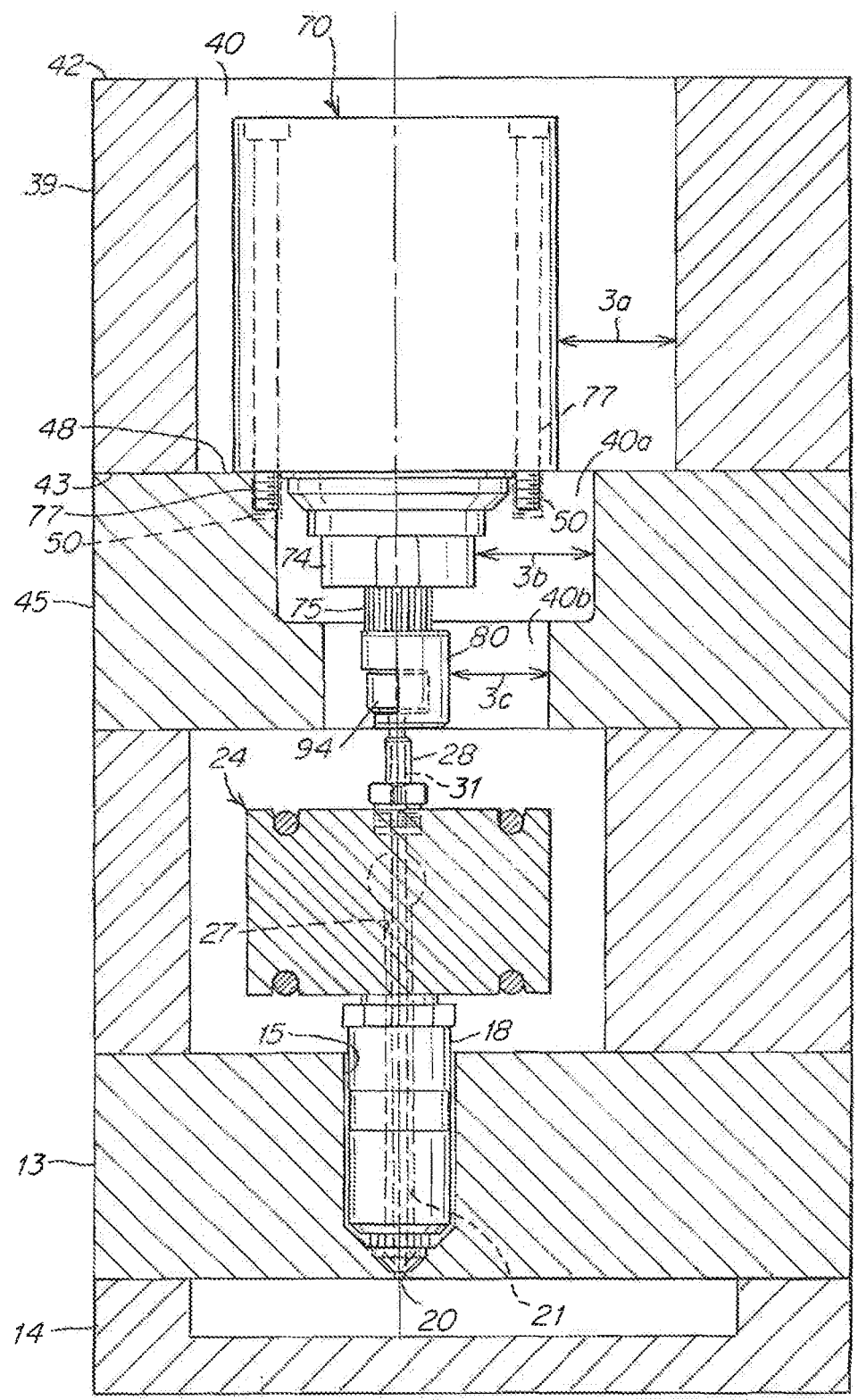
FIG. 10F is a schematic partial cross-sectional view of the actuator and valve pin of FIG. 10E mounted in an injection molding apparatus.

FIG. 10F is a cross section showing the injection molding stack. As previously described, a heated manifold 24 is disposed between the mounting plates 39/45 and mold plates 13/14. In use, the mounting plates and mold plates are fixedly secured together under high clamp pressure, so as to withstand high injection molding forces. A nozzle 18 extends through a bore 15 in the lower mold plate 14, and seats and unseats in the gate 20 to the injection mold cavity. The actuator 66 housing is disposed in a chamber 40 of the upper mounting plate 39, with a radial clearance 3 provided in at least one radial direction so as to facilitate the radial coupling and decoupling of the pin head adapter and actuator coupling. Similarly, there is a radial clearance 3b/3c to allow the neck 75 and adapter 80 to move radial in the plates.

Figure 10G:
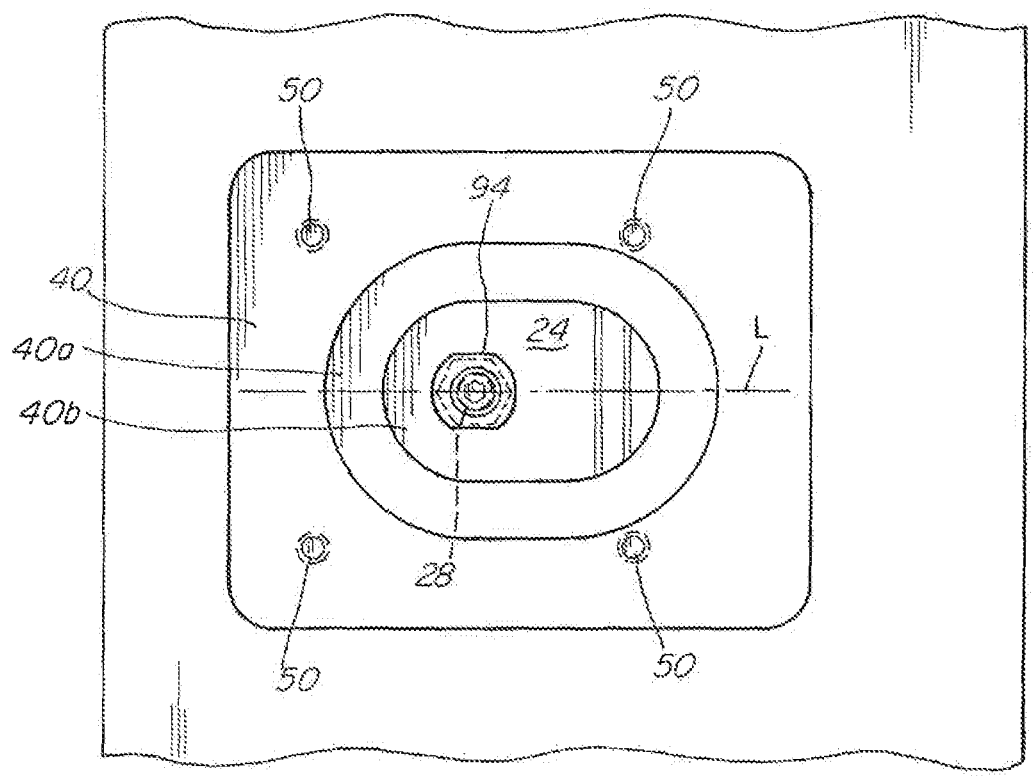
FIG. 10G is a top plan view of the apparatus of FIG. 10E, with the actuator removed.

FIG. 10G is a top plan view of the apparatus of FIG. 10F, but with the electric motor removed. The chamber 40 has a rectilinear cross section. Below the chamber 40, the upper bore 40a has an oval cross section, and the lower bore 40b also has an oval but smaller, cross section, providing a radial clearance along the long axis L of the oval, to facilitate the assembly and disassembly steps described below.

Figure 10H:
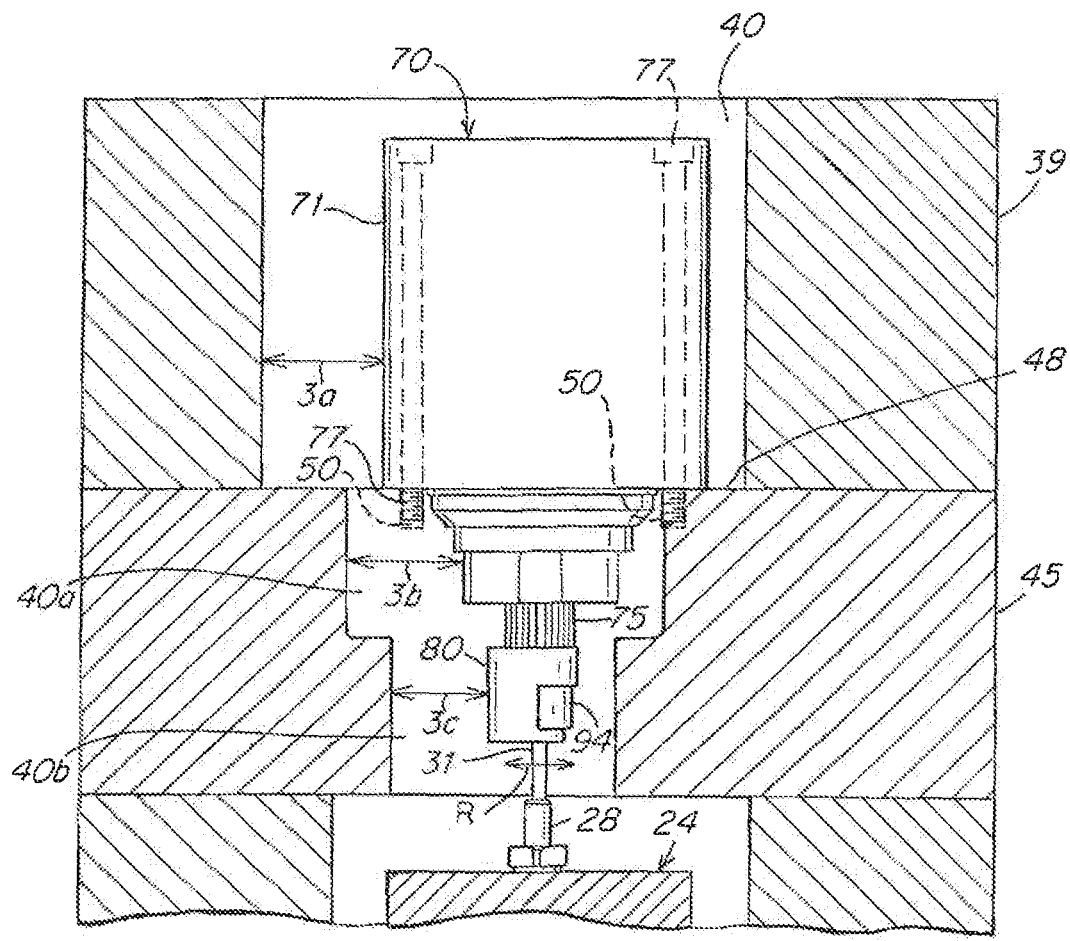
Figure 101:
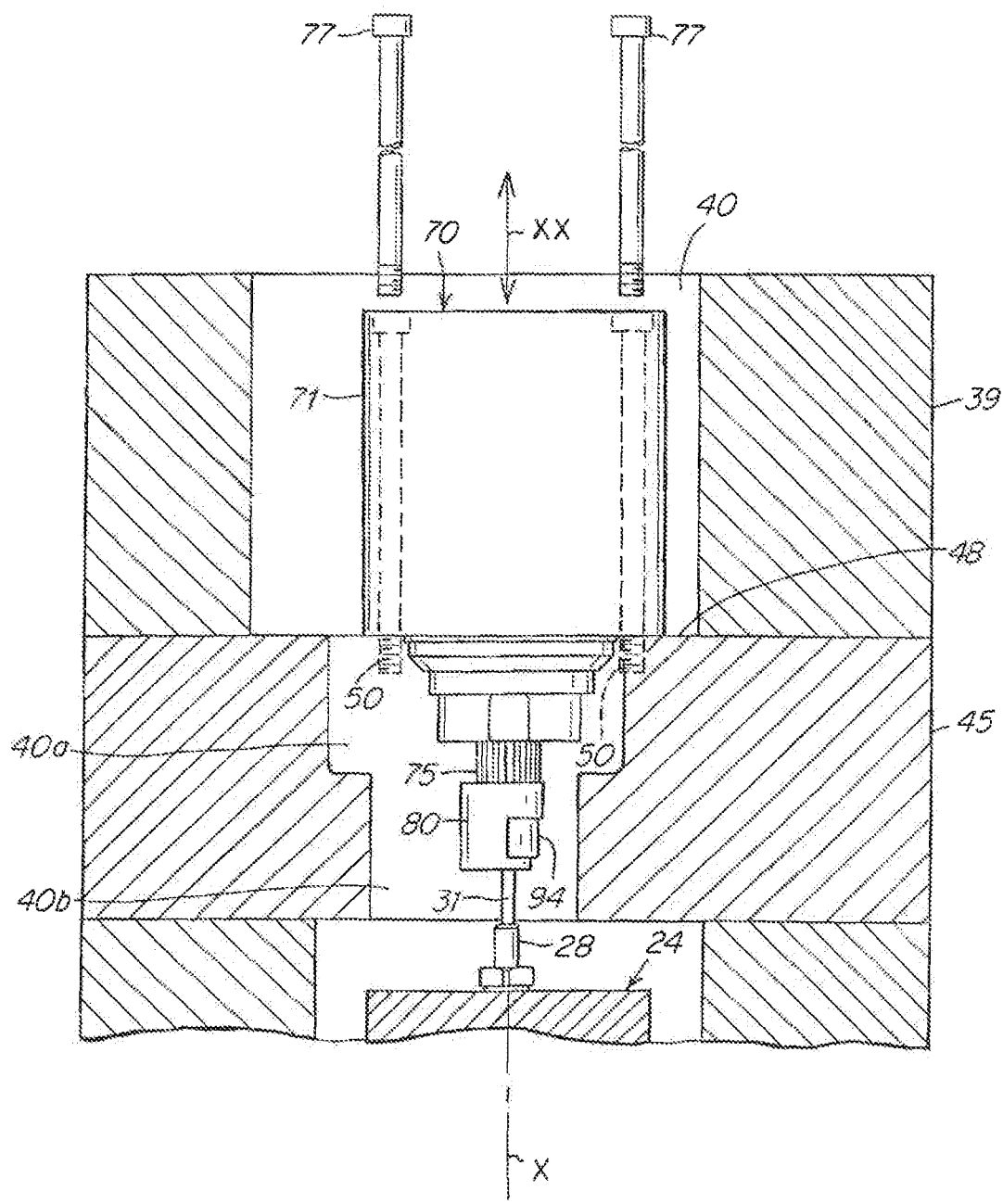

FIGS. 10H-10M illustrate a variety of steps for decoupling the actuator from the mounting plate 39 and for decoupling the valve pin assembly 30, 94 from the actuator coupling 80 and the mounting plate 39, 45, according to one embodiment. In FIG. 10H, the actuator is shown coupled to the valve pin assembly, with the actuator secured to the lower mounting plate and the valve pin assembly mounted in the actuator coupling. This illustrates the actuator and valve pin assembly as assembled during the injection molding cycle, wherein the axial drive path of travel XX of the actuator is substantially axially aligned with the valve stem axis, as the valve stem extends through the axis of the plastic feed bores of the manifold 27 and nozzle 18. The mounting plates 39 45 are clamped to the mold 12 with the manifold 24 secured between the mounting plates and mold.

Figure 10J:
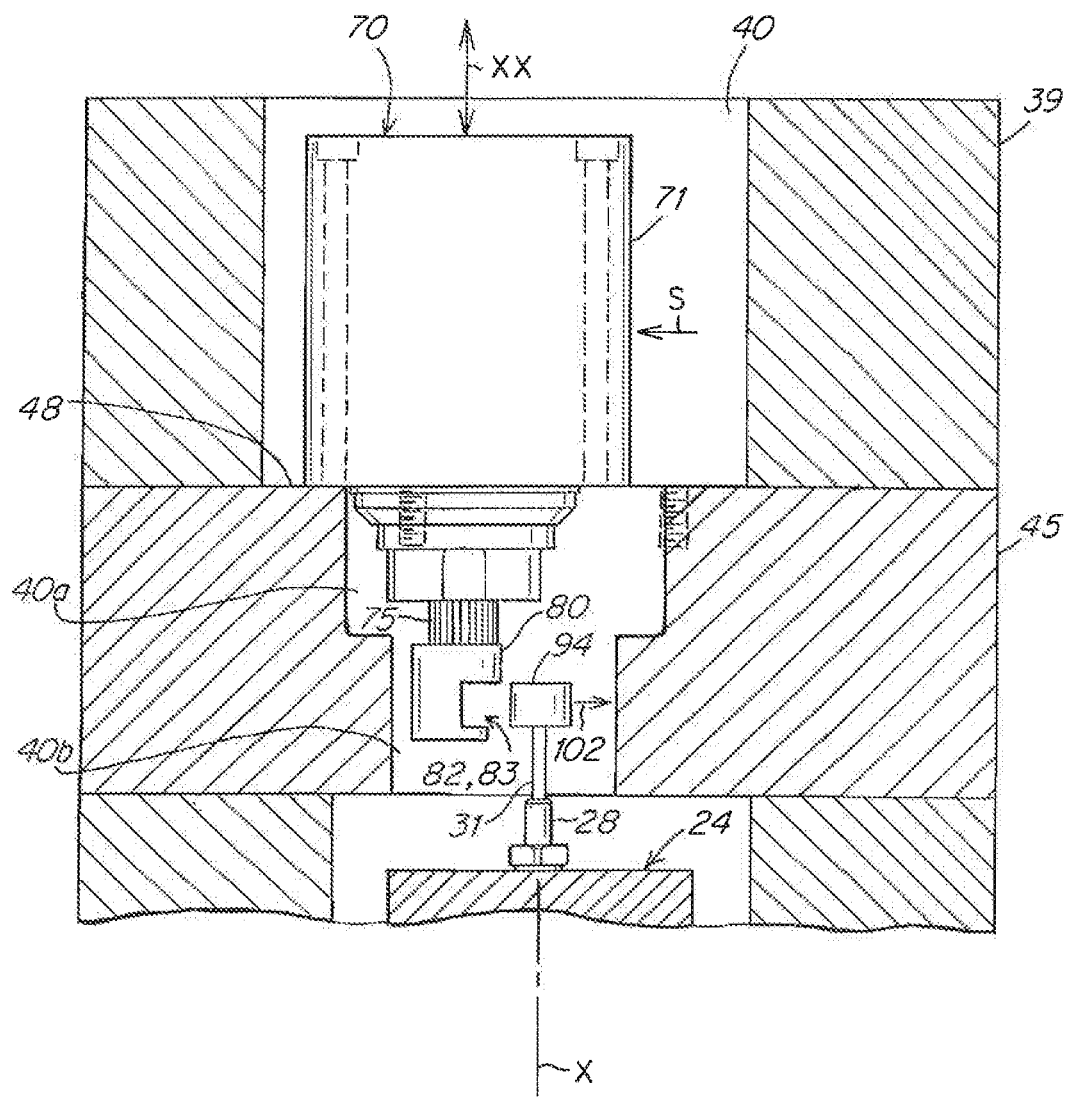
Figure 10K:
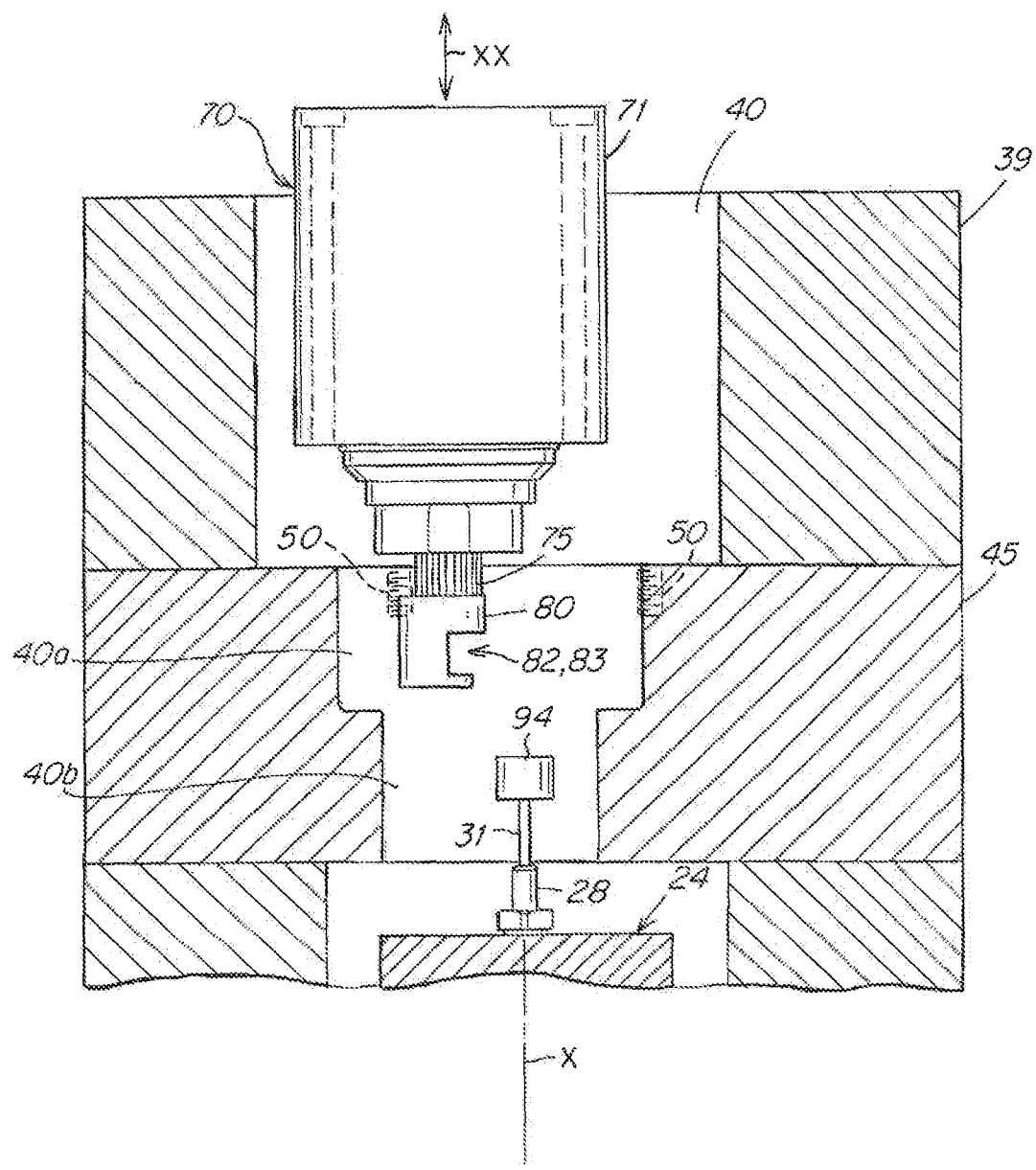
Figure 10L:
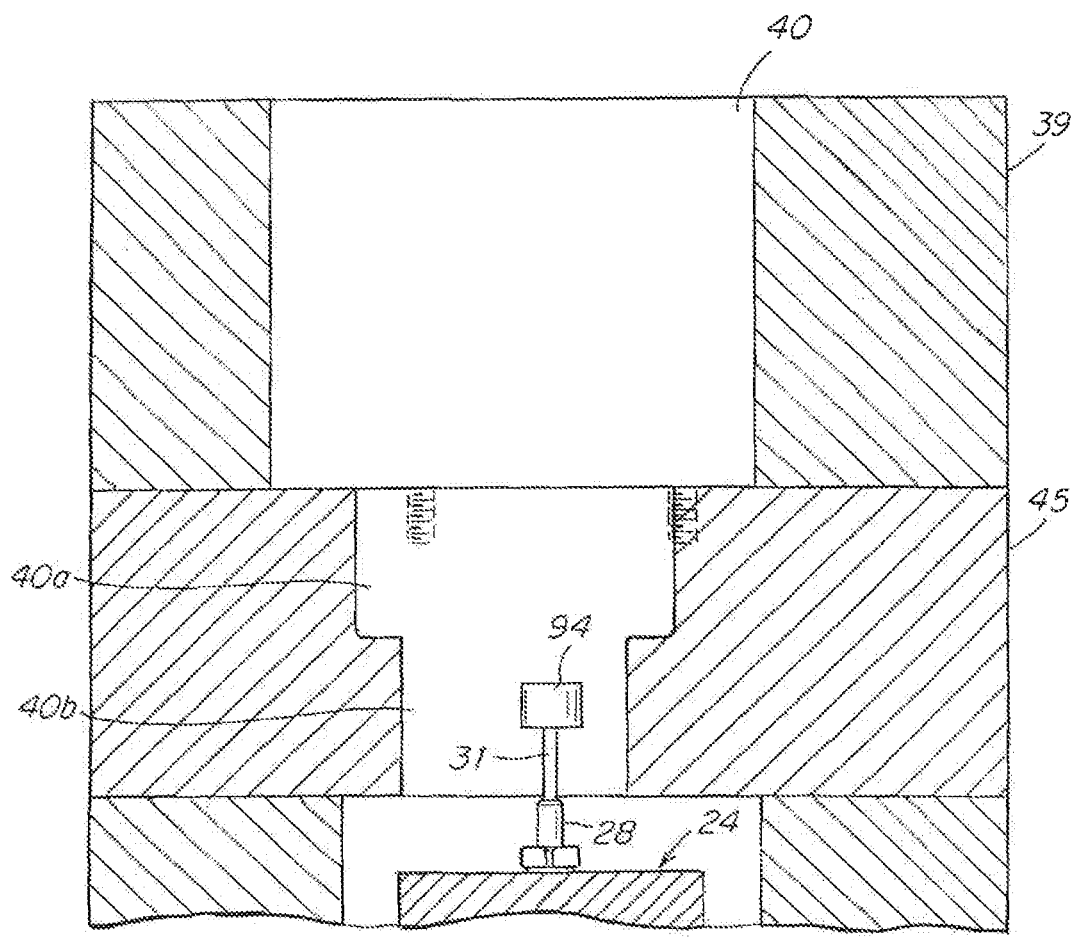

In FIG. 10I the bolts 77 are decoupled from the complementary receiving apertures 50 in the clamp plate 39 thus decoupling the actuator 66 housing from the clamp plate 45. As shown the housing of the actuator 66 and associated neck 75 are disposed upon decoupling of the housing within the plate receiving apertures 40, 40a, 40b. In FIG. 10J, the first two steps of disassembly have been performed. The bolts have been removed and then the actuator 66 housing is moved laterally or radially in direction S so as to decouple pin connector 94 from coupling 80 by sliding the connector 94 radially 102, (FIG. 10J) out of the recess 82, 83 of the coupling. Upon such decoupling of the connector 94, the pin stem 31 and associated parts such as the pin head 34 and adapter 94 and set screw 104 remain behind mounted to the manifold 24 while the actuator 66, is still disposed on the plate 45 and within the recesses 40, 40a, 40b of the mounting plates 39, 45. In a further subsequent operation, the actuator 66 can be removed entirely, FIGS. 10K, 10L, for replacement or repair of the actuator, from the recesses 40, 40a. During this operation the valve pin assembly again remains stationary and behind mounted to the manifold and does not require removal of the pin 30.

Figure 10M:
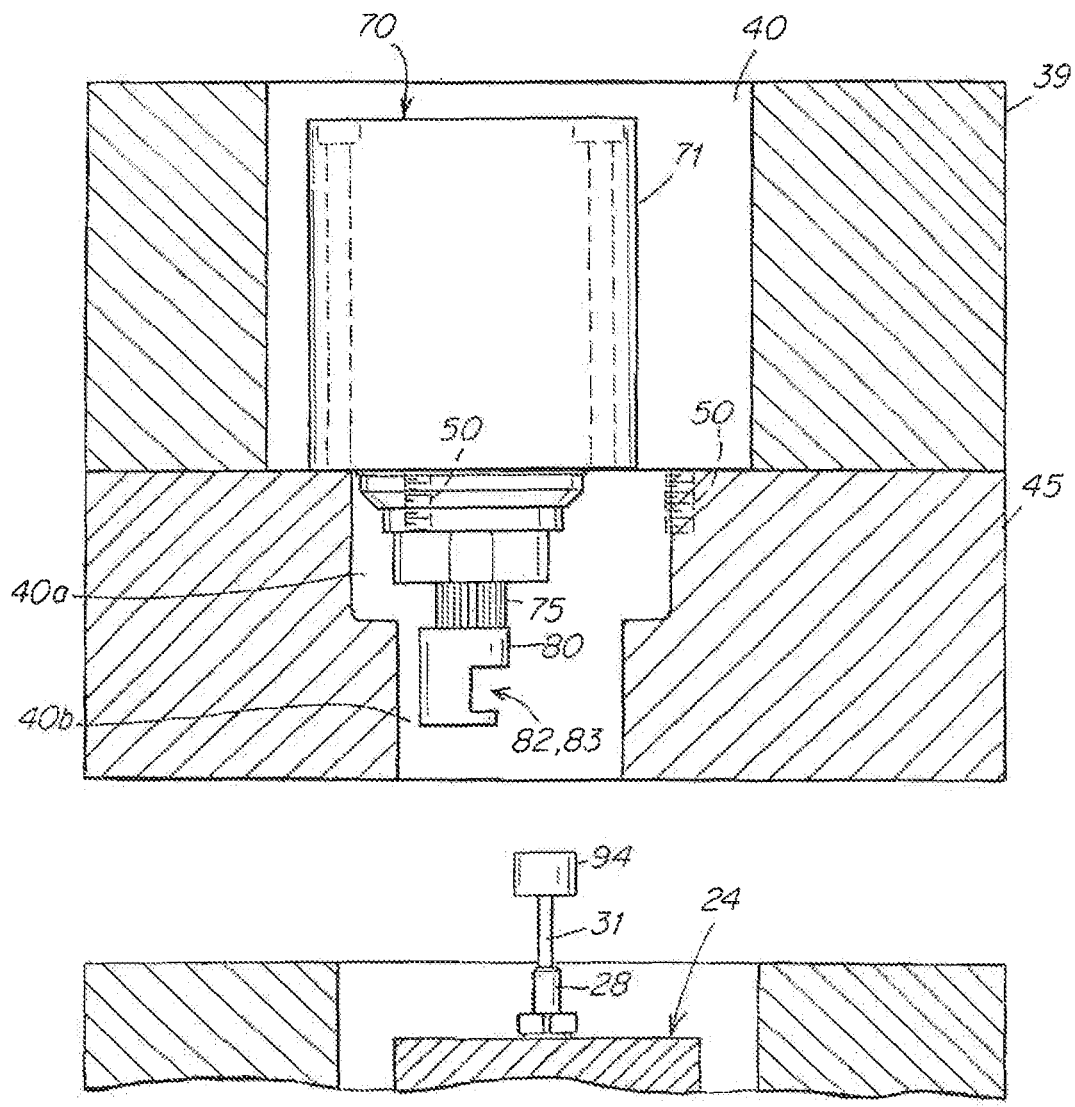

With reference to FIG. 10M, alternatively to removal of only the actuator 66, the mounting plates 39 and/or 45 can also be removed alone or together with the actuator 66 from the mold 12 once the actuator is decoupled from the pin connector 94 without requiring removal of the valve pin 30 (and pin connector 94) from the manifold or nozzle. Thus either the clamp plates 39, 45 can be removed from the system once the pin is decoupled from the actuator coupling 80, or the actuator 66 can removed from the system once the pin is decoupled from the actuator coupling 80, or both the plates and the actuator can be removed from the system once the pin is decoupled from the actuator coupling 80, all such removals being accomplished without removal of the pin 30 from the manifold or nozzle.

In another aspect of the invention there is provided an apparatus for controlling the rate of flow of fluid mold material from an injection molding machine to a mold cavity, the apparatus comprising:

a manifold receiving the injected fluid mold material, the
        manifold having a delivery channel that delivers the
        injected fluid material to a first gate leading to the mold
        cavity;

an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin, the actuator and the valve pin being translationally driven at a controllable rate of travel by a valve system that is controllably adjustable between a start position, one or more intermediate drive rate positions and a high drive rate position, the actuator being driven upstream at one or more intermediate rates of travel when the valve system is in the one or more intermediate drive rate positions and at a higher rate of travel than the one or more intermediate rates of travel when the valve system is in the high drive rate position;

a position sensor and a controller, the position sensor sensing the position of the valve pin and sending a signal indicative of the position of the pin to the controller;

the controller instructing the valve system to drive the actuator and the valve pin continuously upstream from the start position to the second position to the third position;

the controller including instructions that instruct the valve system to move from the start position to the one or more intermediate drive rate positions and subsequently from the one or more intermediate drive rate positions to the high drive rate position on receipt by the controller of a signal from the position sensor that is indicative of the valve pin having reached the second position.

Figure 13A:
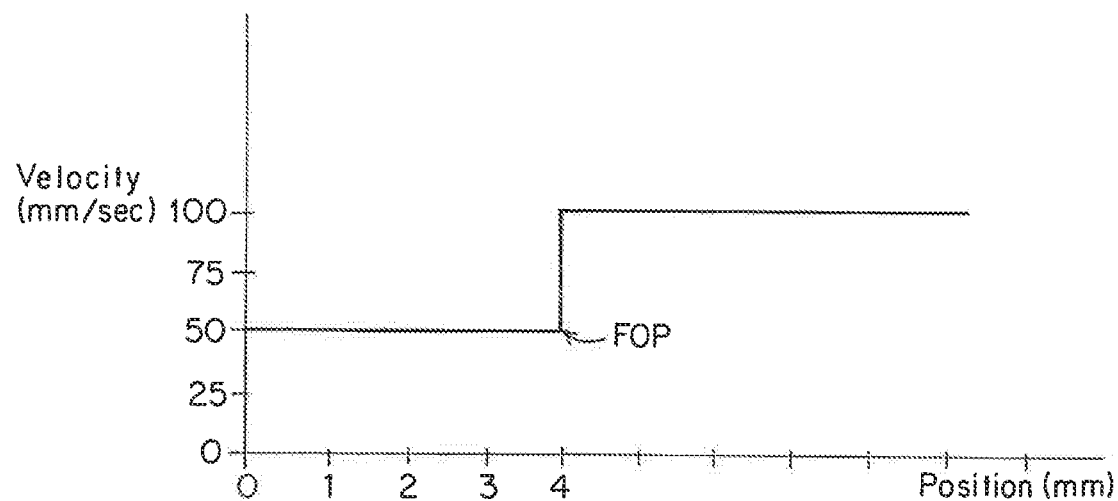
FIGS. 13A-13D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.
Figure 13B:
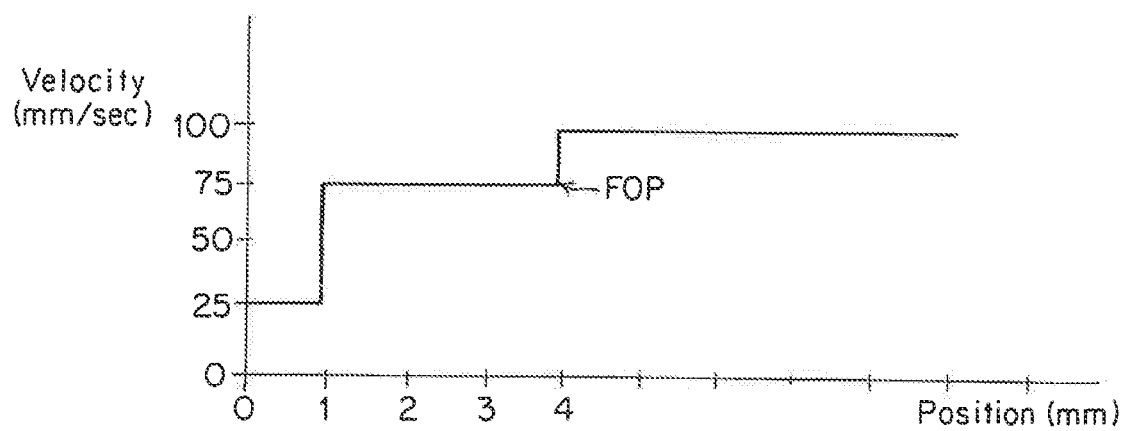

Preferably, the valve pin and the gate are configured or adapted to cooperate with each other to restrict and vary the rate of flow of fluid material 1153, FIGS. 11A-11B, 12A-12B over the course of travel of the tip end of the valve pin through the restricted velocity path RP. Most typically as shown in FIGS. 11A, 11B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 12A, 12B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 13A-13C).

In one embodiment, as the tip end 1142 of the pin 1041 continues to travel upstream from the gate closed GC position (as shown for example in FIGS. 11A, 12A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 13A-13D, where the pin is no longer restricting flow of injection mold material through the gate. In such an embodiment, at the expiration of the predetermined amount of time when the pin tip 1142 reaches the FOP (full open) position FIGS. 13A, 13B, the pin 1041 is immediately driven at maximum velocity FOV (full open velocity).

Figure 13C:
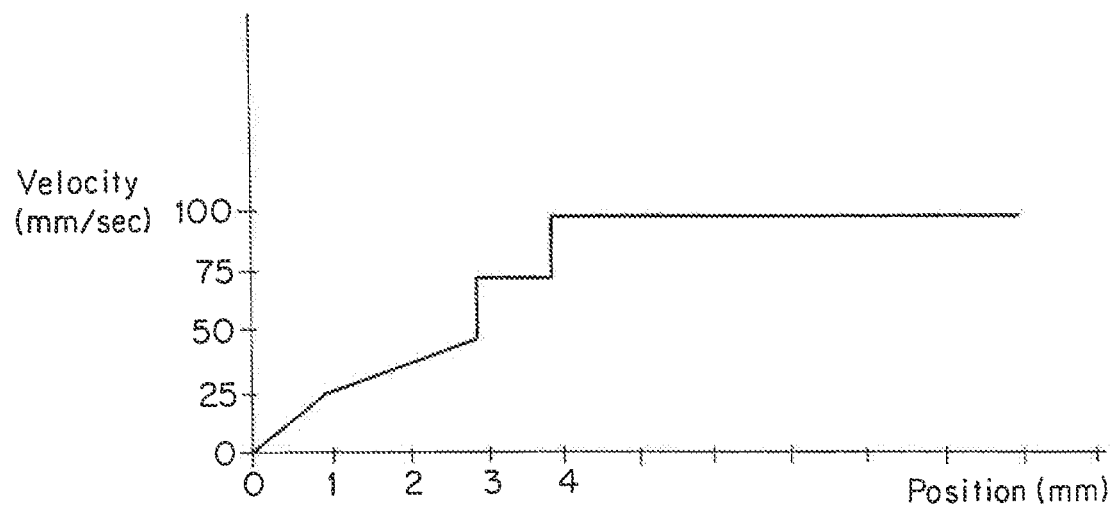
Figure 13D:
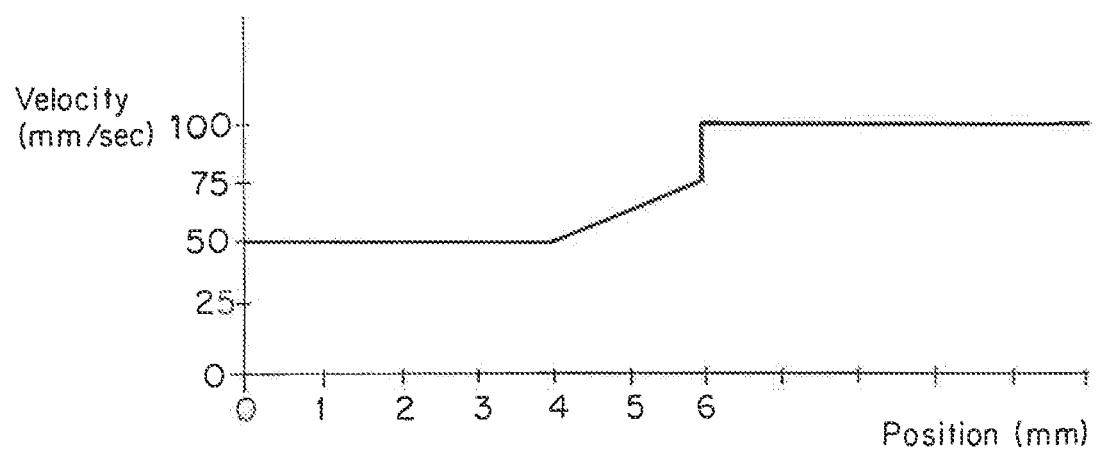

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 11B, 12B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 11B the maximum fluid flow rate for injection material 1153 is reached at the upstream position COP of the tip end 1142. In another example shown in FIG. 11B 12B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 13A, 13B examples, the upstream FOP position is about 4 mm and 5 mm respectively upstream from the gate closed position. Other alternative upstream FOP positions are shown in FIGS. 13C, 13D.

In another alternative embodiment, shown in FIG. 12B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 12B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 16 being programmed to instruct the drive system for the actuator to be driven at one or more reduced velocities for the time or path length of an entire closed GC to fully open EOS cycle.

In the FIGS. 13A-13D examples, FOV is 100 mm/sec. Typically, when the time period for driving the pin 1041 at reduced velocity has expired and the pin tip 1142 has reached the position COP, COP2, the pins 1041, 1042 are driven at the maximum velocity or rate of travel that the system is capable of driving the actuators 941, 942. Alternatively, the pins 1041, 1042 can be driven at a preselected FOV velocity that is less than the maximum velocity at which the pin is capable of being driven but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

What is claimed is:

1. An apparatus for controlling the rate of flow of fluid mold material from an injection molding machine to a mold cavity, the apparatus comprising:
   a manifold that receives an injection fluid mold material, the manifold having a delivery channel that delivers the injection fluid mold material under an injection pressure to a gate of a mold cavity disposed within a mold, the gate being controllably opened and closed by a valve pin comprising a pin stem having a pin axis, the valve pin being slidably mounted for reciprocal upstream and downstream linear movement along the pin axis such that a downstream end of the valve pin is drivable into and out of open and closed positions relative to the gate,
   an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a transmission gear rotatably mounted within a transmission housing, the transmission gear having a gear axis and being drivably rotatable around the gear axis,
   the drive gear, the transmission gear and the valve pin being drivably interconnected and arranged such that the drive axis and the gear axis are non-coaxially mounted or disposed relative to each other and such that driven rotation of the drive gear around the drive axis rotatably drives the transmission gear around the gear axis and linearly drives the valve pin along the pin axis,
   wherein one or the other of the motor housing or the transmission housing are removably attached to a top clamping or mounting plate that is mounted upstream of the manifold and fixedly interconnected to the mold,
   wherein the valve pin includes a pin connector and the transmission is interconnected to a pin coupling, the pin coupling being reversibly couplable to and decouplable from the pin connector without disassembly of the top clamping or mounting plate from the mold.

2. The apparatus of claim 1 wherein the pin coupling includes a slot adapted to reversibly receive the pin connector by radial movement of the pin coupling relative to the pin axis.

3. The apparatus of claim 1 wherein the pin connector comprises a pin head integrally formed with the pin stem.

4. The apparatus of claim 1 wherein the pin connector comprises an adapter coupled to a top or upstream end of the pin stem, the adapter configured to be reversibly receivable within the coupling in a radial direction.

5. The apparatus of claim 4 wherein the adapter comprises an enlarged head which is reversibly couplable to and decouplable from the coupling.

6. The apparatus of claim 1 wherein the pin stem extends into the manifold, the pin connector and the pin coupling being adapted to allow the pin connector to travel a selected radial distance within the pin coupling to accommodate differences in thermal expansion between the manifold and the top clamping or mounting plate while the pin stem remains extended into the manifold.

7. The apparatus of claim 1 wherein the pin stem is mounted to the manifold for radial movement of the pin stem together with the manifold relative to the top clamping or mounting plate.

8. The apparatus of claim 1 wherein the apparatus is adapted to allow the pin connector to travel a selected radial distance within the pin coupling relative to the axial path of travel while the mounting plate remains coupled to the mold, the pin connector remains coupled to the pin coupling and the pin stem remains extended into the manifold.

9. The apparatus of claim 1 wherein the actuator is interconnected to a controller that includes instructions that instruct the actuator to drive the valve pin upstream beginning from the closed position to one or more intermediate upstream positions at one or more intermediate rates of travel that are less than a maximum velocity at which the actuator is capable of driving the valve pin for either a predetermined amount of time or for a predetermined length of upstream travel.

10. The apparatus of claim 9 wherein the controller includes instructions that instruct the actuator to drive the valve pin continuously upstream from the one or more intermediate upstream positions to a maximum upstream position at one or more high rates of travel that are equal to or greater than the one or more intermediate rates of travel.

11. The apparatus of claim 10 further comprising a position sensor that senses a position of either the actuator or the valve pin,
   the position sensor sensing the position of the actuator or the valve pin and sending a signal indicative of the position of the actuator or the valve pin to the controller;
   the controller instructing the actuator to drive the valve pin continuously upstream from the one or more intermediate upstream positions at the one or more high rates of travel on detection by the position sensor of the valve pin at the one or more intermediate upstream positions.

12. The apparatus of claim 9 wherein the actuator is interconnected to a controller that includes instructions that instruct the actuator to drive the valve pin at one or more high rates of downstream travel that are equal to or less than a maximum rate of downstream travel at which the actuator is capable of driving the valve pin when the valve pin is disposed at a maximum upstream position during the course of an injection cycle, the controller including instructions that instruct the actuator to drive the valve pin at one or more intermediate rates of downstream travel that are less than the one or more high rates of downstream travel on expiration of a predetermined amount of time or for a predetermined amount of downstream travel of the valve pin from the maximum upstream position.

13. The apparatus of claim 12 further comprising a position sensor that senses a position of either the actuator or the valve pin,
   the position sensor sensing the position of the actuator or the valve pin and sending a signal indicative of the position of the actuator or the valve pin to the controller;
   the controller instructing the actuator to drive the valve pin continuously downstream at the one or more intermediate rates of downstream travel on detection by the position sensor of the valve pin having travelled the predetermined amount of downstream travel from the maximum upstream position.

14. A method of driving a valve pin comprising operating an apparatus according to claim 1.

15. The method of claim 14 further comprising removing one or the other of the actuator and the transmission from on or within the top clamping or mounting plate without disassembly of the top clamping or mounting plate from the mold.

16. An apparatus for controlling the rate of flow of fluid mold material from an injection molding machine to a mold cavity, the apparatus comprising:
   a manifold that receives an injection fluid mold material, the manifold having a delivery channel that delivers the injection fluid mold material under an injection pressure to a gate of a mold cavity disposed within a mold, the gate being controllably opened and closed by a valve pin comprising a pin stem having a pin axis, the valve pin being slidably mounted for reciprocal upstream and downstream linear movement along the pin axis such that a downstream end of the valve pin is drivable into and out of open and closed positions relative to the gate,
   an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a transmission gear rotatably mounted within a transmission housing, the transmission gear having a gear axis and being drivably rotatable around the gear axis,
   the drive gear, the transmission gear and the valve pin being drivably interconnected and arranged such that the drive axis and the gear axis are non-coaxially mounted or disposed relative to each other and such that driven rotation of the drive gear around the drive axis rotatably drives the transmission gear around the gear axis and linearly drives the valve pin along the pin axis,
   wherein one or the other of the motor housing or the transmission housing are removably attached to a top clamping or mounting plate that is mounted upstream of the manifold and fixedly interconnected to the mold,
   wherein the valve pin includes a pin connector and the transmission is interconnected to a pin coupling, the pin coupling being reversibly couplable to and decouplable from the pin connector by radial movement of the pin coupling relative to the pin axis.

17. The apparatus of claim 16 wherein the pin coupling is adapted to be reversibly couplable to and decouplable from the valve pin without disassembly of the top clamping or mounting plate from the mold.

18. Apparatus according to claim 16 wherein the pin coupling includes a slot adapted to reversibly receive the pin connector by radial movement of the pin coupling relative to the pin axis.

19. The apparatus of claim 16 wherein the pin connector comprises an adapter coupled to a top or upstream end of the pin stem, the adapter configured to be reversibly receivable within the coupling in a radial direction.

20. The apparatus of claim 16 wherein the pin stem extends into the manifold, the pin connector and the pin coupling being adapted to allow the pin connector to travel a selected radial distance within the pin coupling to accommodate differences in thermal expansion between the manifold and the top clamping or mounting plate while the pin stem remains extended into the manifold.

21. The apparatus of claim 16 wherein the pin stem is mounted to the manifold for radial movement of the pin stem together with the manifold relative to the top clamping or mounting plate.

22. The apparatus of claim 16 wherein the apparatus is adapted to allow the pin connector to travel a selected radial distance within the pin coupling relative to the axial path of travel while the mounting plate remains coupled to the mold, the pin connector remains coupled to the pin coupling and the pin stem remains extended into the manifold.

23. The apparatus of claim 16 wherein the actuator is interconnected to a controller that includes instructions that instruct the actuator to drive the valve pin upstream beginning from the closed position to one or more intermediate upstream positions at one or more intermediate rates of travel that are less than a maximum velocity at which the actuator is capable of driving the valve pin for either a predetermined amount of time or for a predetermined length of upstream travel.

24. The apparatus of claim 23 wherein the controller includes instructions that instruct the actuator to drive the valve pin upstream from the one or more intermediate upstream positions to a maximum upstream position at one or more high rates of travel that are equal to or greater than the one or more intermediate rates of travel.

25. The apparatus of claim 16 further comprising a position sensor that senses a position of either the actuator or the valve pin,
   the position sensor sensing the position of the actuator or the valve pin and sending a signal indicative of the position of the actuator or the valve pin to the controller;
   the controller instructing the actuator to drive the valve pin continuously upstream from the one or more intermediate upstream positions at the one or more high rates of travel on detection by the position sensor of the valve pin at the one or more intermediate upstream positions.

26. The apparatus of claim 16 wherein the actuator is interconnected to a controller that includes instructions that instruct the actuator to drive the valve pin at one or more high rates of downstream travel that are equal to or less than a maximum rate of downstream travel at which the actuator is capable of driving the valve pin when the valve pin is disposed at a maximum upstream position during the course of an injection cycle,
   the controller including instructions that instruct the actuator to drive the valve pin at one or more intermediate rates of downstream travel that are less than the one or more high rates of downstream travel on expiration of a predetermined amount of time or for a predetermined amount of downstream travel of the valve pin from the maximum upstream position.

27. The apparatus of claim 16 further comprising a position sensor that senses a position of either the actuator or the valve pin,
   the position sensor sensing the position of the actuator or the valve pin and sending a signal indicative of the position of the actuator or the valve pin to the controller;
   the controller instructing the actuator to drive the valve pin continuously downstream at the one or more intermediate rates of downstream travel on detection by the position sensor of the valve pin having travelled the predetermined amount of downstream travel from the maximum upstream position.

28. A method of driving a valve pin comprising operating an apparatus according to claim 16.

29. The method of claim 28 further comprising removing one or the other of the actuator and the transmission from on or within the top clamping or mounting plate without disassembly of the top clamping or mounting plate from the mold.

30. A method of operating an apparatus for controlling the rate of flow of fluid mold material from an injection molding machine to a mold cavity, the apparatus comprising:
   a manifold that receives an injection fluid mold material, the manifold having a delivery channel that delivers the injection fluid mold material under an injection pressure to a gate of a mold cavity disposed within a mold, the gate being controllably opened and closed by a valve pin comprising a pin stem having a pin axis, the valve pin being slidably mounted for reciprocal upstream and downstream linear movement along the pin axis such that a downstream end of the valve pin is drivable into and out of open and closed positions relative to the gate, the method comprising:

controllably driving the valve pin into and out of the open and closed positions with an electric actuator comprising an electric motor comprised of a motor housing that houses a drive shaft having a drive gear and a drive axis that is rotatably mounted within the motor housing and is drivably rotatable around the drive axis by a source of electrical power or energy and a transmission comprised of a transmission gear rotatably mounted within a transmission housing, the transmission gear having a gear axis and being drivably rotatable around the gear axis, drivably interconnecting the drive gear, the transmission gear and the valve pin in an arrangement wherein the drive axis and the gear axis are non-coaxially mounted or disposed relative to each other and such that driven rotation of the drive gear around the drive axis rotatably drives the transmission gear around the gear axis and linearly drives the valve pin along the pin axis, removably attaching one or the other of the motor housing or the transmission housing to a top clamping or mounting plate that is mounted upstream of the manifold and fixedly interconnected to the mold, interconnecting the valve pin to a pin connector and, interconnecting the transmission to a pin coupling, adapting the pin coupling to be reversibly couplable to and decouplable from the pin connector without disassembly of the top clamping or mounting plate from the mold.

\* \* \* \* \*